US012647997B2

(12) United States Patent
Kuang et al.

(10) Patent No.: US 12,647,997 B2
(45) Date of Patent: Jun. 2, 2026

(54) USER EQUIPMENT AND BASE STATION INVOLVED IN MONITORING OF A CONTROL CHANNEL

(71) Applicant: Panasonic Intellectual Property Corporation of America, Torrance, CA (US)

(72) Inventors: Quan Kuang, Langen (DE); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 219 days.

(21) Appl. No.: 18/291,866

(22) PCT Filed: Jul. 6, 2022

(86) PCT No.: PCT/EP2022/068657
§ 371 (c)(1),
(2) Date: Jan. 24, 2024

(87) PCT Pub. No.: WO2023/006361
PCT Pub. Date: Feb. 2, 2023

(65) Prior Publication Data
US 2024/0334446 A1 Oct. 3, 2024

(30) Foreign Application Priority Data
Jul. 30, 2021 (EP) ..................................... 21188904

(51) Int. Cl.
*H04W 72/231* (2023.01)
*H04W 72/0446* (2023.01)
(Continued)

(52) U.S. Cl.
CPC ..... *H04W 72/231* (2023.01); *H04W 72/0446* (2013.01); *H04W 72/0453* (2013.01); *H04W 72/51* (2023.01)

(58) Field of Classification Search
CPC ........... H04W 72/231; H04W 72/0446; H04W 72/0453; H04W 72/51; H04W 72/512;
(Continued)

(56) References Cited

U.S. PATENT DOCUMENTS

2021/0029726 A1 1/2021 Papasakellariou
2023/0087737 A1* 3/2023 Zhou ..................... H04L 5/0051
370/329
2024/0155545 A1* 5/2024 Dai ....................... H04W 64/00

FOREIGN PATENT DOCUMENTS

EP 3726904 A1 * 10/2020 ............ H04W 72/23

OTHER PUBLICATIONS

3GPP, "3rd Generation Partnership Project; Technical Specification Group Radio Access Network; NR; Multiplexing and channel coding (Release 16)," 3GPP TS 38.212 V16.6.0, Jun. 2021. (153 pages).
(Continued)

*Primary Examiner* — Sun Jong Kim
(74) *Attorney, Agent, or Firm* — Seed Intellectual Property Law Group LLP

(57) ABSTRACT

User equipment includes a processor, a transmitter, and receiver. The processor determines a capability of the UE for operating a monitoring function involving a capability condition regarding a minimum group time gap between two consecutive groups of time spans within a grouping window having a length of one or more slots. The transmitter transmits a capability indication indicating the capability condition to a base station. The receiver receives, from the base station, information for configuring the monitoring
(Continued)

function, including the one or more monitoring occasions in which the UE monitors the downlink control channel.

14 Claims, 11 Drawing Sheets

(51) Int. Cl.
*H04W 72/0453* (2023.01)
*H04W 72/51* (2023.01)
(58) Field of Classification Search
CPC ...... H04W 72/232; H04W 8/24; H04L 5/001; H04L 27/26025; H04L 5/0053
See application file for complete search history.

(56) References Cited

OTHER PUBLICATIONS

3GPP, "3rd Generation Partnership Project; Technical Specification Group Radio Access Network; NR; NR and NG-RAN Overall Description; Stage 2 (Release 16)," 3GPP TS 38.300 V16.6.0, Jun. 2021. (152 pages).
3GPP, "3rd Generation Partnership Project; Technical Specification Group Radio Access Network; NR; Physical channels and modulation (Release 16)," 3GPP TS 38.211 V16.6.0, Jun. 2021. (134 pages).
3GPP, "3rd Generation Partnership Project; Technical Specification Group Radio Access Network; NR; Physical layer procedures for data (Release 16)," 3GPP TS 38.214 V16.6.0, Jun. 2021. (172 pages).
3GPP, "3rd Generation Partnership Project; Technical Specification Group Radio Access Network; NR; Radio Resource Control (RRC) protocol specification (Release 16)," 3GPP TS 38.331 V16.5.0, Jun. 2021. (959 pages).
3GPP, "3rd Generation Partnership Project; Technical Specification Group Radio Access Network; NR; User Equipment (UE) radio access capabilities (Release 16)," 3GPP TS 38.306 V16.5.0, Jun. 2021. (153 pages).
3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).
3GPP, "3rd Generation Partnership Project; Technical Specification Group Services and System Aspects; System architecture for the 5G System (5GS); Stage 2 (Release 16)," 3GPP TS 23.501 V16.7.0, Dec. 2020. (450 pages).
3GPP, "3rd Generation Partnership Project; Technical Specification Group Services and System Aspects; System architecture for the 5G System (5GS); Stage 2 (Release 17)," 3GPP TS 23.501 V17.1.1, Jun. 2021. (526 pages).
3GPP, 3rd Generation Partnership Project; Technical Specification Group Radio Access Network; NR; Physical layer procedures for control (Release 16), 3GPP TS 38.213 V16.6.0, Jun. 2021. (187 pages).
Extended European Search Report, dated Jan. 27, 2022, for European Patent Application No. 21188,904-1212. (12 pages).
International Search Report, mailed Nov. 7, 2022, for International Application No. PCT/EP2022/068657. (4 pages).
International Telecommunication Union (ITU), "Imt Vision—Framework and overall objectives of the future development of IMT for 2020 and beyond," Radiocommunication Sector of the ITU (ITU-R), M.2083-0, Geneva, Sep. 2015. (21 pages).
Moderator (Lenevo), "Feature lead summary #2 for [104b-e-NR-52-71GHz-02] Email discussion/approval on PDCHH Monitoring Enhancements," R1-2104057, Agenda item: 8.2.2, 3GP TSG RAN WG1#104-e, e-Meeting, Apr. 12-20, 2021. (95 pages).
Panasonic, "PDCCH monitoring enhancement for NR from 52.6GHz to 71GHz," R1-2102809, Agenda Item: 8.2.2, 3GPP TSG-RAN WG1 #104bis-e, e-Meeting, Apr. 12-20, 2021. (4 pages).

* cited by examiner

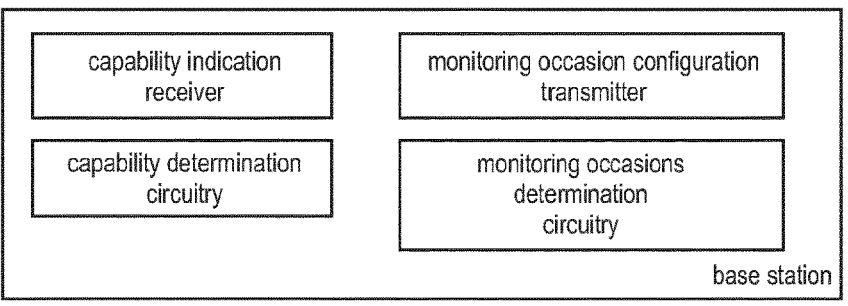

capability indication
receiver monitoring occasion configuration
transmitter capability determination
circuitry monitoring occasions
determination
circuitry base station

Fig. 17

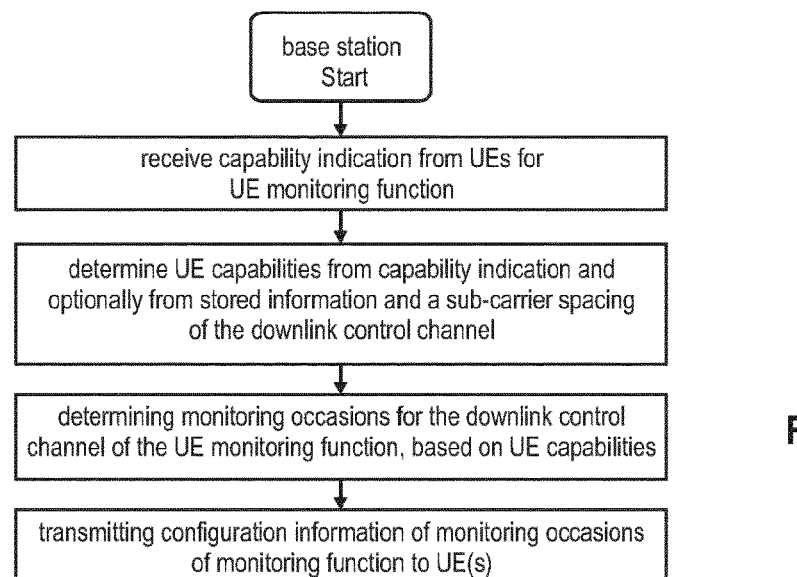

base station
Start receive capability indication from UEs for
UE monitoring function determine UE capabilities from capability indication and
optionally from stored information and a sub-carrier spacing
of the downlink control channel determining monitoring occasions for the downlink control
channel of the UE monitoring function, based on UE capabilities transmitting configuration information of monitoring occasions
of monitoring function to UE(s)

Fig. 18

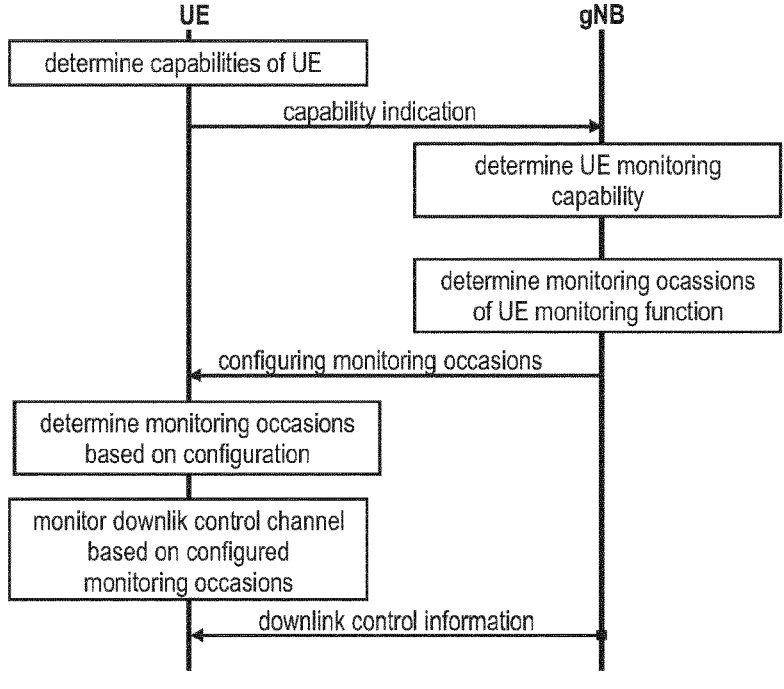

UE                                    gNB determine capabilities of UE capability indication determine UE monitoring
capability determine monitoring ocassions
of UE monitoring function configuring monitoring occasions determine monitoring occasions
based on configuration monitor downlik control channel
based on configured
monitoring occasions downlink control information

Fig. 19

USER EQUIPMENT AND BASE STATION INVOLVED IN MONITORING OF A CONTROL CHANNEL

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see e.g., section 6 of 3GPP TR 38.913 version 16.0.0), at least including enhanced mobile broadband (eMBB), ultra-reliable low-latency communications (URLLC), and massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however, are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating a UE to perform an improved downlink control channel monitoring.

In an embodiment, the techniques disclosed here feature a user equipment, UE, comprising the following. A processor of the UE determines a capability of the UE for operating a monitoring function, wherein the monitoring function is operated by the UE for monitoring a downlink control channel in one or more monitoring occasions for the purpose of receiving a downlink control information message. The determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots, A transmitter of the UE transmits a capability indication to a base station, wherein the capability indication includes information on the determined capability of a UE for operating the monitoring function. The capability indication indicates the first capability condition of the UE and optionally includes the second capability condition of the UE. A receiver of the UE receives, from the base station, configuration information for configuring the monitoring function at the UE, wherein the configuration information configures one or more monitoring occasions in which the UE monitors the downlink control channel.

It should be noted that general or specific embodiments may be implemented as a system, a method, an integrated circuit, a computer program, a storage medium, or any selective combination thereof. For instance, an integrated circuit can control a process of a UE or base station.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 17 illustrates a structure of the base station according to an exemplary implementation of an improved downlink control channel monitoring procedure, FIG. 18 is a flow diagram for the base station behavior that participates in an exemplary implementation of the improved downlink control channel monitoring procedure, FIG. 19 is a signaling diagram illustrating an exemplary exchange between the UE and the gNB for an exemplary implementation of the improved downlink control channel monitoring procedure.

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
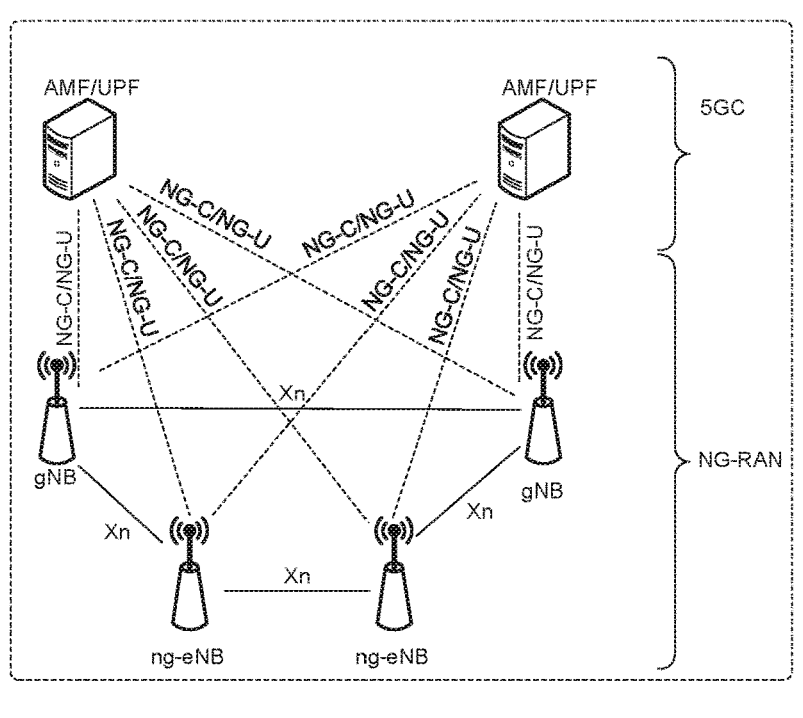
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see e.g., 3GPP TS 38.300 v16.6.0, section 4).

The user plane protocol stack for NR (see e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g., sub-clause 6.5 of TS 38.300). A control plane protocol stack is also defined for NR (see for instance TS 38.300, section 4.4.2). An overview of the Layer 2 functions is given in sub-clause 6 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-$10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.6.0, e.g., section 4). For instance, downlink and uplink transmissions are organized into frames with 10 ms duration, each frame consisting of ten subframes of respectively 1 ms duration. In 5 g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

5G NR Functional Split Between NG-RAN and 5GC

Figure 2:
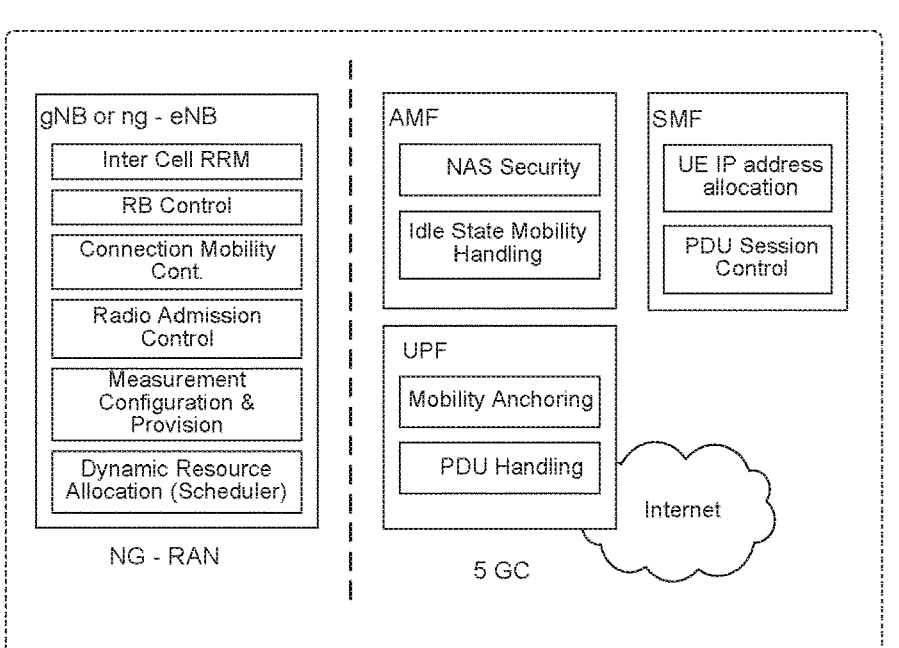
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:

Non-Access Stratum, NAS, signalling termination;

NAS signalling security;

Access Stratum, AS, Security control;

Inter Core Network, CN, node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

Session Management Function, SMF, selection.

Furthermore, the User Plane Function, UPF, hosts the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g., packet filtering, gating, UL/DL rate enforcement;

Uplink Traffic verification (SDF to QoS flow mapping);

Downlink packet buffering and downlink data notification triggering.

Finally, the Session Management function, SMF, hosts the following main functions:

Session Management;

UE IP address allocation and management;

Selection and control of UP function;

Configures traffic steering at User Plane Function, UPF, to route traffic to proper destination;

Control part of policy enforcement and QoS;

Downlink Data Notification.

RRC Connection Setup and Reconfiguration Procedures

Figure 3:
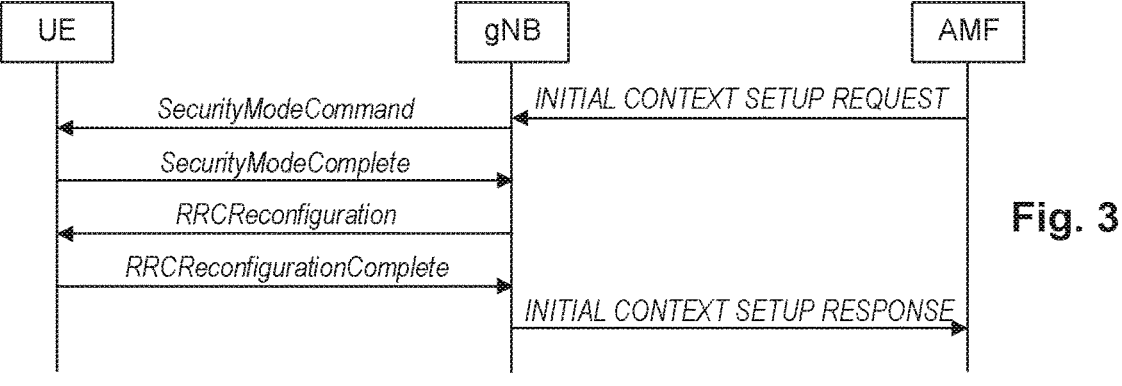
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300).

RRC is a higher layer signaling (protocol) used for UE and gNB configuration. In particular, this transition involves that the AMF prepares the UE context data (including e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example, AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element (IE) to the UE via the signaling radio bearer. The UE then performs an uplink transmission or a downlink reception based on the resource allocation configuration.

Usage Scenarios of IMT for 2020 and Beyond

Figure 4:
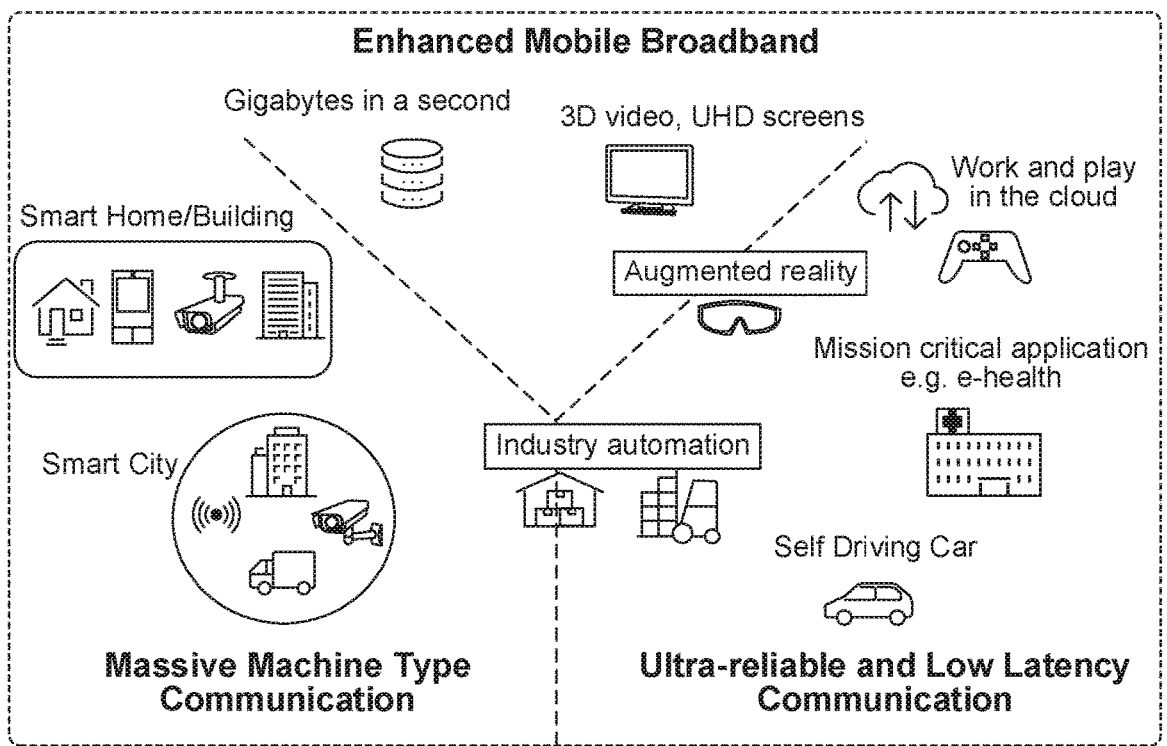
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g., ITU-R M.20183 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913 version 16.0.0. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
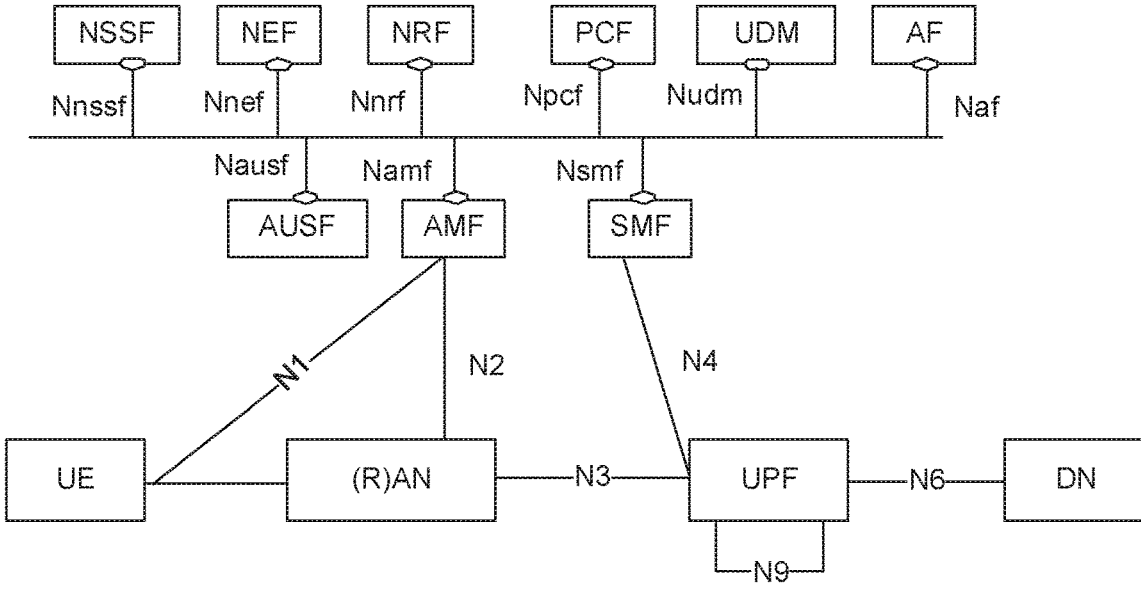
FIG. 5 is a block diagram showing an exemplary 5G system architecture for a non-roaming scenario.

FIG. 5 illustrates a 5G NR non-roaming reference architecture (see e.g., 3GPP TS 23.501 v16.7.0 or v17.1.1, section 4.2.3). An Application Function (AF), e.g., an external application server hosting 5G services, exemplarily described in FIG. 4, interacts with the 3GPP Core Network in order to provide services, for example, to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example, NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Bandwidth Parts

NR systems will support much wider maximum channel bandwidths than LTE's 20 MHz bandwidth (e.g., 100 s of MHz). Wideband communication is also supported in LTE via carrier aggregation (CA) of up to 20-MHz component carriers. By defining wider channel bandwidths in NR, it is possible to dynamically allocate frequency resources via scheduling, which can be more efficient and flexible than the Carrier Aggregation operation of LTE, whose activation/deactivation is based on MAC Control Elements. Having a single wideband carrier also has merit in terms of low control overhead, as it needs only a single control signaling (Carrier Aggregation requires separate control signaling per each aggregated carrier).

Moreover, like LTE. NR may also support the aggregation of multiple carriers via carrier aggregation or dual connectivity.

Since UEs are not always demanding high data rates, the use of a wide bandwidth may incur higher idling power consumption both from RF and baseband signal processing perspectives. In this regard, a newly developed concept of bandwidth parts for NR provides a means of operating UEs with smaller bandwidths than the configured channel bandwidth, so as to provide an energy-efficient solution despite the support of wideband operation. Any low-end terminal, which cannot access the whole bandwidth for NR, can benefit therefrom.

A bandwidth part (BWP) is a subset of the total cell bandwidth of a cell, e.g., defined by the location and number of contiguous physical resource blocks (PRBs). It may be defined separately for uplink and downlink. Furthermore, each bandwidth part can be associated with a specific OFDM numerology, e.g., with a subcarrier spacing and cyclic prefix. For instance, bandwidth adaptation is achieved by configuring the UE with BWP(s) and telling the UE which of the configured BWPs is currently the active one.

Exemplarily, in 5G NR, a specific BWP is configured only for a UE in RRC_Connected state. For instance, other than an initial BWP (e.g., respectively one for UL and one for DL), a BWP only exists for UEs in connected state. To support the initial data exchange between the UE and the network, e.g., during the process of moving a UE from RRC_IDLE or RRC_INACTIVE state to RRC_CONNECTED state, the initial DL BWP and initial UL BWP are configured in the minimum system information.

Although the UE can be configured with more than one BWP (e.g., up to 4 BWP per serving cell, as currently defined for NR), the UE has only one active DL BWP at a time. Switching between configured BWPs may be achieved for instance by means of downlink control information (DCIs).

For the Primary Cell (PCell), the initial BWP is the BWP used for initial access, and the default BWP is the initial one unless another initial BWP is explicitly configured. For a Secondary Cell (SCell), the initial BWP is always explicitly configured, and a default BWP may also be configured. When a default BWP is configured for a serving cell, the expiry of an inactivity timer associated to that cell switches the active BWP to the default one.

Some DCI formats do not contain the BWP ID (such as Formats 0_0 and 1_0), while in other DCI formats the number of bits for BWP ID is RRC-configurable and could be 0, 1, 2 bits (such as for Formats 0_1, 0_2, 1_1, and 1_2).

Figure 6:
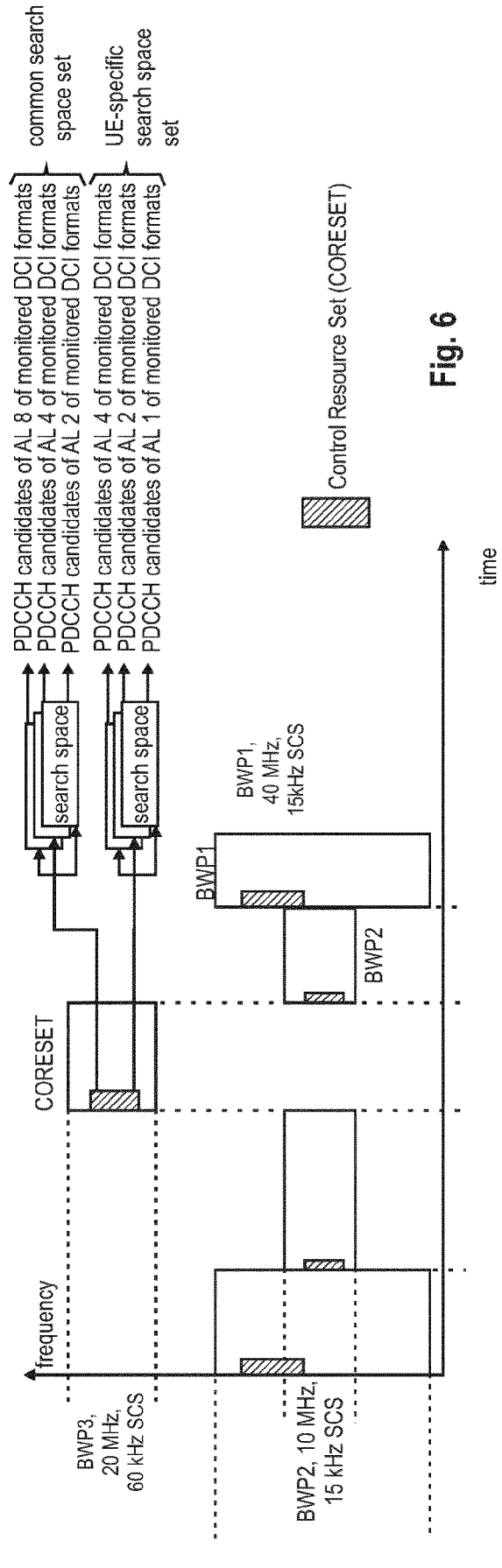
FIG. 6 illustrates the relationship between Bandwidth Parts, Control Resource Sets (CORESETS), search spaces, search space sets, and PDCCH candidates.

FIG. 6 illustrates a scenario where three different BWPs are configured, BWP1 with a frequency bandwidth of 40 MHz and a subcarrier spacing of 15 kHz, BWP2 with a width of 10 MHz and a subcarrier spacing of 15 kHz, and BWP3 with a width of 20 MHz and subcarrier spacing of 60 kHz.

Control Information—Search Space Sets

PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed, e.g., downlink control information, DCI) has basically the same purpose in 5G NR as the DCI in LTE, namely being a special set of control information that e.g., schedules a downlink data channel (e.g., the PDSCH) or an uplink data channel (e.g., PUSCH). In 5G NR there are a number of different DCI Formats defined already (see TS 38.212 v16.6.0 section 7.3.1). An overview is given by the following table.

| DCI format | Usage |
|---|---|
| 0_0 | Scheduling of PUSCH in one cell |
| 0_1 | Scheduling of PUSCH in one cell |
| 0_2 | Scheduling of PUSCH in one cell |
| 1_0 | Scheduling of PDSCH in one cell |
| 1_1 | Scheduling of PDSCH in one cell |
| 1_2 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Cancel UL transmission |
| 2_5 | Notify availability of soft resources |
| 2_6 | Notify power saving information |
| 3_0 | Scheduling for Sidelink, NR PSCCH and NR PSSCH in one cell |
| 3_1 | Scheduling for Sidelink; LTE PSCCH and LTE PSSCH in one cell |

In 5G NR, PDCCH is transmitted in radio resource regions called control resource sets (CORESETs). In LTE, the concept of a CORESET is not explicitly present. Instead, PDCCH in LTE uses the full carrier bandwidth in the first 1-3 OFDM symbols (four for the most narrowband case). By contrast, a CORESET in NR can occur at any position within a slot and anywhere in the frequency range of the carrier, except that the UE is not expected to handle CORESETs outside its active bandwidth part (BWP).

Accordingly, a UE performs a monitoring operation of the PDCCH, e.g., as defined in 3GPP TS 38.213 version 16.6.0, sections 10 and 11. As exemplarily defined therein, the UE monitors a set of PDCCH candidates, which is defined in terms of PDCCH search space sets. A search space set can be a common search space set (CSS set) or a UE-specific search space set (USS set). As defined exemplarily by 3GPP TS 38.213 v16.6.0, section 10.1, a UE monitors PDCCH candidates in one or more of the following CSS and USS sets:

a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommnon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

Search space sets are monitored in one or more CORESETs on the active DL BWP on each activated serving cell configured with PDCCH monitoring using the corresponding search space sets, where monitoring implies decoding each PDCCH candidate according to the monitored DCI formats.

The first CORESET, CORESET 0, is provided by the master information block (MIB) as part of the configuration of the initial bandwidth part to be able to receive the remaining system information and additional configuration information from the network. After connection setup, a UE can be configured with multiple CORESETs using RRC signalling.

In an exemplary 5G NR implementation, a search space may comprise a plurality of PDCCH candidates associated with the same aggregation level (e.g., where PDCCH candidates differ regarding the DCI formats to monitor). In turn, a search space set may comprise a plurality of search spaces of different aggregation levels, but being associated with the same CORESET. Unlike in LTE, as mentioned above, where control channels span the entire carrier bandwidth, the bandwidth of a CORESET can be configured, e.g., within an active DL frequency bandwidth part (BWP). Put differently, the CORESET configuration defines the frequency resources for the search space set and thus for the comprised PDCCH candidates of the search spaces in the set. The CORESET configuration also defines the duration of the search space set, which can have a length of one to three OFDM symbols. On the other hand, the start time is configured by the search space set configuration itself, e.g., at which OFDM symbol the UE starts monitoring the PDCCH of the search spaces of the set. In combination, the configuration of the search space set and the configuration of the CORESET provide an unambiguous definition in the frequency and time domain about the PDCCH monitoring requirements of the UE (see e.g., 3GPP TS 38.213 v16.6.0, section 10.1).

Conceptually, FIG. 6 provides an exemplary illustration of the relationship between bandwidth parts, CORESETS, search spaces, search space sets and the PDCCH candidates that a UE can monitor. As apparent from FIG. 6, one CORESET is illustrated per BWP, although more than one are possible. Each CORESET can then have several search spaces of one or more PDCCH candidates of a particular Aggregation Level (such as AL2, 4 or 8), which in turn can then be grouped into a search space set, such as a common SS set and a UE-specific SS set.

Both CORESET and search space set configurations can be semi-statically done via RRC signalling, wherein the corresponding RRC information elements are ControlResourceSet and SearchSpace, as e.g., provided below following the definitions in 3GPP TS 38.331 v16.5.0 section 6.3.2.

ControlResourceSet

The IE ControlResourceSet is used to configure a time/frequency control resource set (CORESET) in which to search for downlink control information (see TS 38.213 [13], clause 10.1).

ControlResourceSet Information Element

```
-- ASN1START
-- TAG-CONTROLRESOURCESET-START
ControlResourceSet ::=                    SEQUENCE {
    controlResourceSetId                      ControlResourceSetId,
    frequencyDomainResources                  BIT STRING (SIZE (45)),
    duration                                  INTEGER (1..maxCoReSetDuration),
    cce-REG-MappingType                       CHOICE {
        interleaved                               SEQUENCE {
            reg-BundleSize                            ENUMERATED {n2, n3, n6},
            interleaverSize                           ENUMERATED {n2, n3, n6},
            shiftIndex                            INTEGER (0..maxNrofPhysicalResourceBlocks-1)
    OPTIONAL -- Need S
        },
        nonInterleaved                            NULL
    },
    precoderGranularity            ENUMERATED {sameAsREG-bundle, allContiguousRBs},
    tci-StatesPDCCH-ToAddList               SEQUENCE (SIZE (1..maxNrofTCI-StatesPDCCH)) OF
TCI-StateId OPTIONAL, -- Cond NotSIB1-initialBWP
    tci-StatesPDCCH-ToReleaseList           SEQUENCE(SIZE (1..maxNrofTCI-StatesPDCCH)) OF
TCI-StateId OPTIONAL, -- Cond NotSIB1-initialBWP
    tci-PresentInDCI               ENUMERATED {enabled}  OPTIONAL,   -- Need S
    pdcch-DMRS-ScramblingID        INTEGER (0..65535)        OPTIONAL,   -- Need S
    ...,
```

-continued

```
[[
rb-Offset-r16              INTEGER (0..5)                OPTIONAL,-- Need S
tci-PresentDCI-1-2-r16     INTEGER (1..3)                OPTIONAL,-- Need S
coresetPoolIndex-r16       INTEGER (0..1)                OPTIONAL,-- Need S
controlResourceSetId-v1610    ControlResourceSetId-v1610    OPTIONAL -- Need S
]]
}
-- TAG-CONTROLRESOURCESET-STOP
-- ASN1STOP
```

---

ControlResourceSet field descriptions cce-REG-MappingType
Mapping of Control Channel Elements (CCE) to Resource Element Groups (REG) (see TS 38.211 [16], clauses 7.3.2.2 and 7.4.1.3.2).
controlResourceSetId
Identifies the instance of the ControlResourceSet IE. Value 0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell.
If the field controlResourceSetId-v1610 is present, the UE shall ignore the controlResourceSetId field (without suffix).
coresetPoolIndex
The index of the CORESET pool for this CORESET as specified in TS 38.213 [13] (clauses 9 and 10) and TS 38.214 [19] (clauses 5.1 and 6.1). If the field is absent, the UE applies the value 0.
duration
Contiguous time duration of the CORESET in number of symbols (see TS 38.211 [16], clause 7.3.2.2).
frequency DomainResources
Frequency domain resources for the CORESET. Each bit corresponds a group of 6 RBs, with grouping starting from the first RB group in the BWP. When at least one search space is configured with freqMonitorLocation-r16, only the first $N_{RBG,\ set0}^{size}$ bits are valid (see TS 38.213 [13], clause 10.1). The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see TS 38.211 [16], clause 7.3.2.2).
interleaverSize
Interleaver-size (see TS 38.211 [16], clause 7.3.2.2).
pdcch-DMRS-ScramblingID
PDCCH DMRS scrambling initialization (see TS 38.211 [16], clause 7.4.1.3.1). When the field is absent the UE applies the value of the physCellId configured for this serving cell.
precoderGranularity
Precoder granularity in frequency domain (see TS 38.211 [16], clauses 7.3.2.2 and 7.4.1.3.2).
rb-Offset
Indicates the RB level offset in units of RB from the first RB of the first 6RB group to the first RB of BWP (see 38.213 [13], clause 10.1). When the field is absent, the UE applies the value 0.
reg-BundleSize
Resource Element Groups (REGs) can be bundled to create REG bundles. This parameter defines the size of such bundles (see TS 38.211 [16], clause 7.3.2.2).
shiftIndex
When the field is absent the UE applies the value of the physCellIdconfigured for this serving cell (see TS 38.211 [16], clause 7.3.2.2).
tci-PresentInDCI
This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell if enableDefaultBeamForCCS is not configured (see TS 38.214 [19], clause 5.1.5).
tci-PresentDCI-1-2
Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5).
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries.

-continued

| ControlResourceSet field descriptions | |
|---|---|
| Conditional Presence | Explanation |
| NotSIBI-initialBWP | The field is absent in SIB1 and in the PDCCH-ConfigCommon of the initial BWP in ServingCellConfigCommon, if SIB1 is broadcasted. Otherwise, it is optionally present, Need N. |

SearchSpace

The IE SearchSpace defines how/where to search for PDCCH candidates. Each search space is associated with one ControlResourceSet. For a scheduled cell in the case of cross carrier scheduling, except for nrofCandidates, all the optional fields are absent (regardless of their presence conditions).

SearchSpace Information Element

```
-- ASN1START
-- TAG-SEARCHSPACE-START
SearchSpace ::=                               SEQUENCE {
    searchSpaceId                                 SearchSpaceId,
    controlResourceSetId                          ControlResourceSetId
OPTIONAL,         -- Cond SetupOnly
    monitoringSlotPeriodicityAndOffset            CHOICE {
        sl1                                           NULL,
        sl2                                           INTEGER (0..1),
        sl4                                           INTEGER (0..3),
        sl5                                           INTEGER (0..4),
        sl8                                           INTEGER (0..7),
        sl10                                          INTEGER (0..9),
        sl16                                          INTEGER (0..15),
        sl20                                          INTEGER (0..19),
        sl40                                          INTEGER (0..39),
        sl80                                          INTEGER (0..79),
        sl160                                         INTEGER (0..159),
        sl320                                         INTEGER (0..319),
        sl640                                         INTEGER (0..639),
        sl1280                                        INTEGER (0..1279),
        sl2560                                        INTEGER (0..2559)
    }                                             OPTIONAL,         -- Cond Setup
    duration                        INTEGER (2..2559)       OPTIONAL,    -- Need R
    monitoringSymbolsWithinSlot     BIT STRING (SIZE (14))  OPTIONAL, -- Cond Setup
    nrofCandidates                                SEQUENCE {
        aggregationLevel1             ENUMERATED {n0, n1, n2, n3, n4, n5, n6, n8},
        aggregationLevel2             ENUMERATED {n0, n1, n2, n3, n4, n5, n6, n8},
        aggregationLevel4             ENUMERATED {n0, n1, n2, n3, n4, n5, n6, n8},
        aggregationLevel8             ENUMERATED (n0, n1, n2, n3, n4, n5, n6, n8},
        aggregationLevel16            ENUMERATED (n0, n1, n2, n3, n4, n5, n6, n8}
    }                                             OPTIONAL,       -- Cond Setup
    searchSpaceType                               CHOICE {
        common                                        SEQUENCE {
            dci-Format 0-0-AndFormat1-0                   SEQUENCE {
                ...
            }                                             OPTIONAL,          -- Need R
            dci-Format2-0                                 SEQUENCE {
                nrofCandidates-SFI                            SEQUENCE {
                    aggregationLevel1     ENUMERATED (n1, n2} OPTIONAL,          -- Need R
                    aggregationLevel2     ENUMERATED {n1, n2} OPTIONAL,          -- Need R
                    aggregationLevel4     ENUMERATED {n1, n2} OPTIONAL,          -- Need R
                    aggregationLevel8     ENUMERATED {n1, n2} OPTIONAL,          -- Need R
                    aggregationLevel16    ENUMERATED {n1, n2} OPTIONAL          -- Need R
                },
                ...
            }                                             OPTIONAL,      -- Need R
            dci-Format2-1                                 SEQUENCE {
                ...
            }                                             OPTIONAL,      -- Need R
            dci-Format2-2                                 SEQUENCE {
                ...
            }                                             OPTIONAL,      -- Need R
            dci-Format2-3                                 SEQUENCE {
                dummy1        ENUMERATED {sl1, sl2, sl4, sl5, sl8, sl10, sl16, sl20}
OPTIONAL,        -- Cond Setup
                dummy2        ENUMERATED {n1, n2},
                ...
            }                                             OPTIONAL    -- Need R
        },
        ...
```

-continued

```
      ue-Specific                                                        SEQUENCE {
                  dci-Formats        ENUMERATED {formats0-0-And-1-0, formats0-1-And-1-1},
                  ...,
                  [[
                  dci-Formats-MT-r16   ENUMERATED {formats2-5}         OPTIONAL,        -- Need R
                  dci-FormatsSL-r16    ENUMERATED {formats0-0-And-1-0, formats0-1-And-1-
1, formats3-0, formats3-1, formats3-0-And-3-1}                         OPTIONAL,        -- Need R
                  dci-FormatsExt-r16   ENUMERATED {formats0-2-And-1-2, formats0-1-And-1-
1And-0-2-And-1-2}                                                      OPTIONAL         -- Need R
                  ]]
      }
  }                                                          OPTIONAL            -- Cond Setup2
}
SearchSpaceExt-r16 ::=                           SEQUENCE {
   controlResourceSetId-r16                         ControlResourceSetId-r16                OPTIONAL,
-- Cond SetupOnly2
   searchSpaceType-r16                              SEQUENCE {
     common-r16                                       SEQUENCE {
         dci-Format2-4-r16                              SEQUENCE {
           nrofCandidates-CI-r16                          SEQUENCE {
             aggregationLevel1-r16   ENUMERATED {n1, n2} OPTIONAL,        -- Need R
             aggregationLevel2-r16   ENUMERATED {n1, n2} OPTIONAL,        -- Need R
             aggregationLevel4-r16   ENUMERATED {n1, n2} OPTIONAL,        -- Need R
             aggregationLevel8-r16   ENUMERATED {n1, n2} OPTIONAL,        -- Need R
             aggregationLevel16-r16   ENUMERATED {n1, n2} OPTIONAL         -- Need R
           },
           ...
         }                                              OPTIONAL,     -- Need R
         dci-Format2-5-r16                              SEQUENCE {
           nrofCandidates-IAB-r16                         SEQUENCE {
             aggregationLevel1-r16   ENUMERATED {n1, n2} OPTIONAL,        -- Need R
             aggregationLevel2-r16   ENUMERATED {n1, n2} OPTIONAL,        -- Need R
             aggregationLevel4-r16   ENUMERATED {n1, n2} OPTIONAL,        -- Need R
             aggregationLevel8-r16   ENUMERATED {n1, n2} OPTIONAL,        -- Need R
             aggregationLevel16-r16   ENUMERATED {n1, n2} OPTIONAL         -- Need R
           },
           ...
         }                                              OPTIONAL,     -- Need R
         dci-Format2-6-r16                              SEQUENCE {
           ...
         }                                              OPTIONAL,     -- Need R
         ...
     }
  }                                            OPTIONAL,           -- Cond Setup3
   searchSpaceGroupIdList-r16                   SEQUENCE (SIZE (1.. 2)) OF INTEGER (0..1)
OPTIONAL,        -- Need R
   freqMonitorLocations-r16                     BIT STRING (SIZE (5))        OPTIONAL       -- Need R
}
-- TAG-SEARCHSPACE-STOP
-- ASN1STOP
```

---

SearchSpace field descriptions common
Configures this search space as common search space (CSS) and DCI formats to monitor.
controlResourceSetId
The CORESET applicable for this SearchSpace. Value 0 identifies the common CORESET#0
configured in MIB and in ServingCellConfigCommon. Values 1 . . . maxNrofControlResourceSets-
1 identify CORESETs configured in System Information or by dedicated signalling. The
CORESETs with non-zero controlResourceSetId are configured in the same BWP as this
SearchSpace. If the field controlResourceSetId-r16 is present, UE shall ignore the
controlResourceSetId (without suffix).
dummy1, dummy2
This field is not used in the specification. If received it shall be ignored by the UE.
dci-Format0-0-AndFormat1-0
If configured, the UE monitors the DCI formats 0_0 and 1_0 according to TS 38.213 [13],
clause 10.1.
dci-Format2-0
If configured, UE monitors the DCI format 2_0 according to TS 38.213 [13], clause 10.1,
11.1.1.
dci-Format2-1
If configured, UE monitors the DCI format 2_1 according to TS 38.213 [13], clause 10.1, 11.2.
dci-Format2-2
If configured, UE monitors the DCI format 2_2 according to TS 38.213 [13], clause 10.1, 11.3.
dci-Format2-3

-continued

---

SearchSpace field descriptions

---

If configured, UE monitors the DCI format 2_3 according to TS 38.213 [13], clause 10.1, 11.4
dci-Format2-4
If configured, UE monitors the DCI format 2_4 according to TS 38.213 [13], clause 11.2A.
dci-Format2-5
If configured, IAB-MT monitors the DCI format 2_5 according to TS 38.213 [13], clause 14.
dci-Format2-6
If configured, UE monitors the DCI format 2_6 according to TS 38.213 [13], clause 10.1, 11.5.
DCI format 2_6 can only be configured on the SpCell.
dci-Formats
Indicates whether the UE monitors in this USS for DCI formats 0-0 and 1-0 or for formats 0-1
and 1-1.
dci-FormatsExt
If this field is present, the field dci-Formats is ignored and dci-FormatsExt is used instead to
indicate whether the UE monitors in this USS for DCI format 0_2 and 1_2 or formats 0_1 and
1_1 and 0_2 and 1_2 (see TS 38.212 [17], clause 7.3.1 and TS 38.213 [13], clause 10.1). This
field is not configured for operation with shared spectrum channel access in this release.
dci-Formats-MT
Indicates whether the IAB-MT monitors the DCI formats 2-5 according to TS 38.213 [13],
clause 14,
dci-FormatsSL
Indicates whether the UE monitors in this USS for DCI formats 0-0 and 1-0 or for formats 0-1
and 1-1 or for format 3-0 or for format 3-1 or for formats 3-0 and 3-1. If this field is present,
the field dci-Formats is ignored and dci-FormatsSL is used.
duration
Number of consecutive slots that a SearchSpace lasts in every occasion, i.e., upon every period
as given in the periodicityAndOffset. If the field is absent, the UE applies the value 1 slot,
except for DCI format 2_0. The UE ignores this field for DCI format 2_0. The maximum valid
duration is periodicity-1 (periodicity as given in the monitoringSlotPeriodicityAndOffset).
For IAB-MT, duration indicates number of consecutive slots that a SearchSpace lasts in every
occasion, i.e., upon every period as given in the periodicityAndOffset. If the field is absent, the
IAB-MT applies the value 1 slot, except for DCI format 2_0 and DCI format 2_5. The IAB-MT
ignores this field for DCI format 2_0 and DCI format 2_5. The maximum valid duration is
periodicity-1 (periodicity as given in the monitoringSlotPeriodicityAndOffset).
freqMonitorLocations
Defines an association of the search space to multiple monitoring locations in the frequency
domain and indicates whether the pattern configured in the associated CORESET is replicated
to a specific RB set, see TS 38.213, clause 10.1. Each bit in the bitmap corresponds to one RB
set, and the leftmost (most significant) bit corresponds to RB set 0 in the BWP. A bit set to 1
indicates that a frequency domain resource allocation replicated from the pattern configured in
the associated CORESET is mapped to the RB set.
monitoringSlotPeriodicityAndOffset
Slots for PDCCH Monitoring configured as periodicity and offset. If the UE is configured to
monitor DCI format 2_1, only the values 'sl1,' 'sl2' or 'sl4' are applicable. If the UE is
configured to monitor DCI format 2_0, only the values 'sl1,' 'sl2,' 'sl4,' 'sl5,' 'sl8,' 'sl10,'
'sl16,' and 'sl20' are applicable (see TS 38.213 [13], clause 10). If the UE is configured to
monitor DCI format 2_4, only the values 'sl1,' 'sl2,' 'sl4,' 'sl5,' 'sl8' and 'sl10' are applicable.
For IAB-MT, If the IAB-MT is configured to monitor DCI format 2_1, only the values 'sl1,'
'sl2' or 'sl4' are applicable. If the IAB-MT is configured to monitor DCI format 2_0 or DCI
format 2_5, only the values 'sl1,' 'sl2,' 'sl4,' 'sl5,' 'sl8,' 'sl10,' 'sl16,' and 'sl20' are applicable
(see TS 38.213, clause 10).
monitoringSymbolsWithinSlot
The first symbol(s) for PDCCH monitoring in the slots configured for PDCCH monitoring (see
monitoringSlotPeriodicityAndOffset and duration). The most significant (left) bit represents the
first OFDM in a slot, and the second most significant (left) bit represents the second OFDM
symbol in a slot and so on. The bit(s) set to one identify the first OFDM symbol(s) of the
control resource set within a slot. If the cyclic prefix of the BWP is set to extended CP, the last
two bits within the bit string shall be ignored by the UE or IAB-MT.
For DCI format 2_0, the first one symbol applies if the duration of CORESET (in the IE
ControlResourceSet) identified by controlResourceSetId indicates 3 symbols, the first two
symbols apply if the duration of CORESET identified by controlResourceSetId indicates 2
symbols, and the first three symbols apply if the duration of CORESET identified by
controlResourceSetId indicates 1 symbol.
See TS 38.213 [13], clause 10.
For IAB-MT: For DCI format 2_0 or DCI format 2_5, the first one symbol applies if the
duration of CORESET (in the IE ControlResourceSet) identified by controlResourceSetId
indicates 3 symbols, the first two symbols apply if the duration of CORESET identified by
controlResourceSetId indicates 2 symbols, and the first three symbols apply if the duration of
CORESET identified by controlResourceSetId indicates 1 symbol.
See TS 38.213 [13], clause 10.
nrofCandidates-CI
The number of PDCCH candidates specifically for format 2-4 for the configured aggregation
level. If an aggregation level is absent, the UE does not search for any candidates with that
aggregation level. The network configures only one aggregationLevel and the corresponding
number of candidates (see TS 38.213 [13], clause 10.1).

-continued

| SearchSpace field descriptions |
| --- | nrofCandidates-SFI
The number of PDCCH candidates specifically for format 2-0 for the configured aggregation
level. If an aggregation level is absent, the UE does not search for any candidates with that
aggregation level. The network configures only one aggregationLevel and the corresponding
number of candidates (see TS 38.213 [13], clause 11.1.1). For a search space configured with
freqMonitorLocations-r16, only value 'n1' is valid.
nrofCandidates
Number of PDCCH candidates per aggregation level. The number of candidates and
aggregation levels configured here applies to all formats unless a particular value is specified or
a format-specific value is provided (see inside searchSpaceType). If configured in the
SearchSpace of a cross carrier scheduled cell, this field determines the number of candidates
and aggregation levels to be used on the linked scheduling cell (see TS 38.213 [13], clause 10).
searchSpaceGroupIdList
List of search space group IDs which the search space is associated with. The network
configures at most 2 search space groups per BWP where the group ID is either 0 or 1.
searchSpaceId
Identity of the search space. SearchSpaceId = 0 identifies the searchSpaceZero configured via
PBCH (MIB) or ServingCellConfigCommon and may hence not be used in the SearchSpace IE.
The searchSpaceId is unique among the BWPs of a Serving Cell. In case of cross carrier
scheduling, search spaces with the same searchSpaceId in scheduled cell and scheduling cell are
linked to each other. The UE applies the search space for the scheduled cell only if the DL
BWPs in which the linked search spaces are configured in scheduling cell and scheduled cell are
both active.
For an IAB-MT, the search space defines how/where to search for PDCCH candidates for an
IAB-MT. Each search space is associated with one ControlResearchSet. For a scheduled cell in
the case of cross carrier scheduling, except for nrofCandidates, all the optional fields are absent.
searchSpaceType
Indicates whether this is a common search space (present) or a UE specific search space as well
as DCI formats to monitor for.
ue-Specific
Configures this search space as UE specific search space (USS). The UE monitors the DCI
format with CRC scrambled by C-RNTI, CS-RNTI (if configured), and SP-CSI-RNTI (if
configured)

| Conditional Presence | Explanation |
| --- | --- |
| Setup | This field is mandatory present upon creation of a new SearchSpace. It is optionally present, Need M, otherwise. |
| Setup2 | This field is mandatory present when a new SearchSpace is set up, if the same SearchSpace ID is not included in searchSpacesToAddModListExt-r16 of the parent IE with the field searchSpaceType-r16 included. Otherwise it is optionally present, Need M. |
| Setup3 | This field is mandatory present when a new SearchSpace is set up, if the same SearchSpace ID is not included in searchSpacesToAddModListExt (without suffix) of the parent IE with the field searchSpaceType (without suffix) included. Otherwise it is optionally present, Need M. |
| SetupOnly | This field is mandatory present upon creation of a new SearchSpace. It is absent, Need M, otherwise. |
| SetupOnly2 | In PDCCH-Config, the field is optionally present upon creation of a new SearchSpace and absent, Need M upon reconfiguration of an existing SearchSpace. In PDCCH-ConfigCommon, the field is absent. |

The UE performs processes to determine the search spaces, respectively search space sets, from some of the above parameters. An exemplary operation by the UE in said respect is provided below, following the definitions provided by 3GPP TS 38.213 v16.6.0 section 10.1 "UE procedure for determining physical downlink control channel assignment."

For each DL BWP configured to a UE in a serving cell, the UE is provided by higher layers with S≤10 search space sets where, for each search space set from the S search space sets, the UE is provided the following by SearchSpace:

a search space set index s, 0<s<40, by searchSpaceId
an association between the search space set s and a CORESET p by controlResourceSetId or by controlResourceSetId-v1610 a PDCCH monitoring periodicity of $k_s$ slots and a PDCCH monitoring offset of $o_s$ slots, by monitoringSlotPeriodicityAndOffset a PDCCH monitoring pattern within a slot, indicating first symbol(s) of the CORESET within a slot for PDCCH monitoring, by monitoringSymbolsWithinSlot a duration of $T_s < k_s$ slots indicating a number of slots that the search space set s exists by duration a number of PDCCH candidates $$M_s^{(L)}$$

per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively an indication that search space set s is either a CSS set or a USS set by searchSpaceType if search space set s is a CSS set an indication by dci-Format0-0-AndFormat1-0 to monitor PDCCH candidates for DCI format 0_0 and DCI format 1_0 an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level an indication by dci-Format2-1 to monitor PDCCH candidates for DCI format 2_1 an indication by dci-Format2-2 to monitor PDCCH candidates for DCI format 2_2 an indication by dci-Format2-3 to monitor PDCCH candidates for DCI format 2_3 an indication by dci-Format2-4 to monitor PDCCH candidates for DCI format 2_4 an indication by dci-Format2-6 to monitor PDCCH candidates for DCI format 2_6 if search space set s is a USS set, an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or an indication by dci-FormatsSL to monitor PDCCH candidates for DCI format 0_0 and DCI format 1_0, or for DCI format 0_1 and DCI format 1_1, or for DCI format 3_0, or for DCI format 3_1, or for DCI format 3_0 and DCI format 3_1 a bitmap by freqMonitorLocations, if provided, to indicate an index of one or more RB sets for the search space set s, where the MSB k in the bitmap corresponds to RB set k−1 in the DL BWP. For RB set k indicated in the bitmap, the first PRB of the frequency domain monitoring location confined within the RB set is given by $$RB_{s0+k,DL}^{start,\mu} + N_{RB}^{offset}, \text{ where } RB_{s0+k,DL}^{start,\mu}$$

is the index of first common RB of the RB set k [6, TS 38.214], and $$N_{RB}^{offset}$$

is provided by rb-Offset or $$N_{RB}^{offset} = 0$$

if rb-Offset is not provided. For each RB set with a corresponding value of 1 in the bitmap, the frequency domain resource allocation pattern for the monitoring location is determined based on the first $$N_{RBG,set\ 0}^{size}$$

bits infrequencyDomainResources provided by the associated CORESET configuration.

Furthermore, according to one 5G-compliant example (see again by 3GPP TS 38.213 v16.6.0 section 10.1), the UE determines PDCCH monitoring occasions as follows:

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $$n_{s,f}^{\mu}$$

[4, TS 38.211] in a frame with number $n_f$ if $$\left(n_f \cdot N_{slot}^{frame,\mu} + n_{s,f}^{\mu} - o_s\right) \bmod k_s = 0.$$

The UE monitors PDCCH candidates for search space set s for $T_s$ consecutive slots, starting from slot $$n_{s,f}^{\mu},$$

and does not monitor PDCCH candidates for search space set s for the next $k_s - T_s$ consecutive slots.

As apparent from the above exemplary UE procedure for determining search space set(s), search space sets can also be distinguished between common search space sets and user-specific search space sets.

Figure 7:
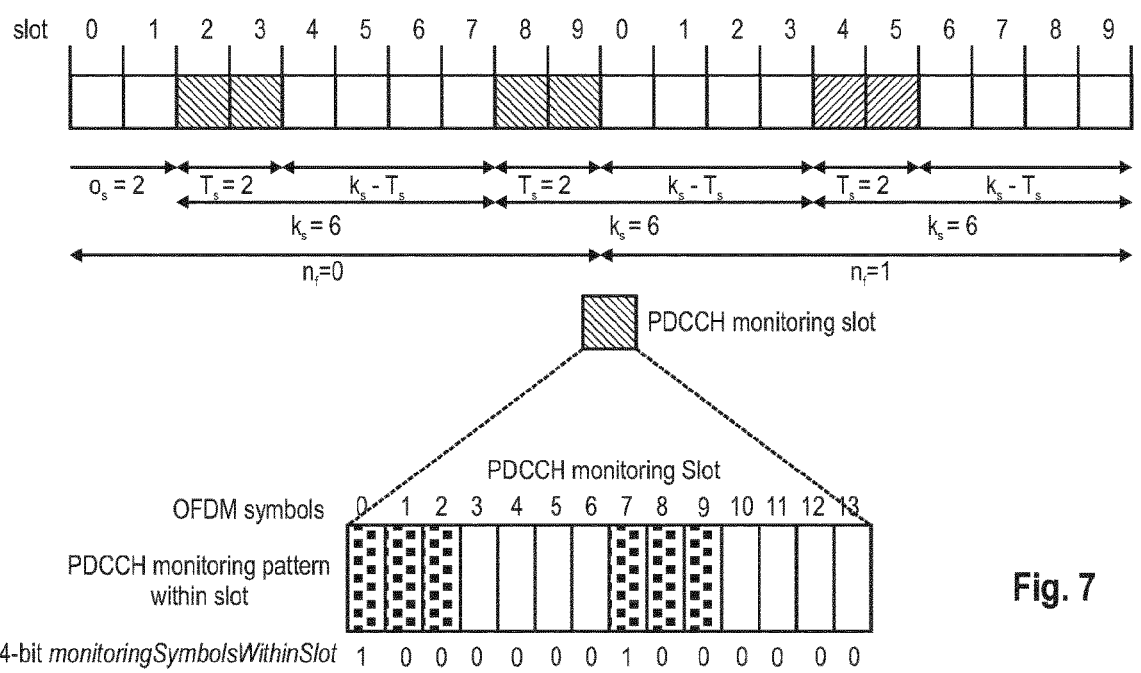
FIG. 7 illustrates an example configuration of PDCCH monitoring slots and the PDCCH monitoring pattern within the PDCCH monitoring slots.

FIG. 7 illustrates an example definition of the PDCCH monitoring occasions, in line with the above-provided exemplary definition of the 5G standards, particularly using the parameters, $o_s$, $k_s$, $T_s$, $n_f$, monitoringSymbolsWithinSlot, provided by the RRC information elements. In the exemplary scenario of FIG. 7, the following assumptions are made:

a PDCCH monitoring periodicity $k_s$ of 6 slots, a PDCCH monitoring offset $o_s$ of 2 slots, a duration of $T_s$ of 2 slots, the number of slots per frame is 10 (0 . . . 9); $n_f$ is the number of the radio frame The above-defined formula $$\left(n_f \cdot N_{slot}^{frame,\mu} + n_{s,f}^{\mu} - o_s\right)$$

mod $k_s = 0$ is fulfilled for radio frame $n_f = 0$ in case of PDCCH monitoring slots $$n_{s,f}^{\mu} = 2$$

and 8, and for radio frame $n_f=1$ in case of PDCCH monitoring slot $$n_{s,f}^{\mu} = 4.$$

Put differently, slots 2 and 8 of radio frame 0 and slot 4 of radio frame 1 are slots in which PDCCH monitoring occasions exist. Considering that the duration $T_s$ is assumed to be 2 slots, the PDCCH monitoring occasions also exist in slots 3, 9 of radio frame 0 and slot 5 of radio frame 1. The UE does not need to monitor PDCCH candidates for search space set s for the next $k_s$–$T_s$ consecutive slots.

In summary, the UE determines that slots 2, 3, 8, 9 of radio frame 0 have PDCCH monitoring occasions, and thus monitors the PDCCH in those slots. The PDCCH slot monitoring is performed according to the PDCCH monitoring pattern within a slot, also illustrated in FIG. 7 and explained in the following.

Such a slot configured for PDCCH monitoring may be one or more PDCCH monitoring occasions. A PDCCH monitoring pattern within the slot is configured using the parameter monitoringSymnbolsWithinSlot, which is a 14-bit string, each bit of which is associated with a corresponding symbol of the slot. The parameter indicates the first symbol(s) for PDCCH monitoring in the slots configured for PDCCH monitoring, wherein the most significant (left) bit represents the first OFDM symbol in a slot, and the second most significant (left) bit represents the second OFDM symbol in a slot, and so on. Put differently, the bit(s) set to 1 identify respectively the first OFDM symbol of a control resource set within the slot. Further, the duration of the monitoring occasion is defined by the duration of the CORE-SET that is associated with the search space set s of the PDCCH monitoring occasions. Together, the first symbol(s) and the duration define the PDCCH monitoring pattern within a slot.

As exemplary assumed for FIG. 7, the PDCCH monitoring slots respectively have two monitoring occasions, located in consecutive OFDM symbols 0, 1, 2 respectively It should be further noted that the PDCCH monitoring occasions for one SS set may or may not overlap (partially or fully) with PDCCH monitoring occasions for another SS set.

In the context of FIGS. 6 and 7 above, a very specific example on how the gNB can configure search spaces, search space sets, PDCCH monitoring occasions and how to indicate them to the UE, particularly with regard to a current version of the 5G NR standard Rel. 16. However, it should be noted that the above is merely an example and other ways of configuring and indicating search spaces, search space sets, PDCCH monitoring occasions are possible too and are equally usable with the below described improved solutions, UEs and base stations and corresponding methods.

UE Capability Indication

In the context of the PDCCH monitoring, the UE can assist the gNB in configuring the search space sets by providing information on the UE capability. Different UEs can have different PDCCH monitoring capabilities. For instance, a UE that supports URLLC (ultra-reliable low-latency communications) will have a higher PDCCH monitoring capability than e.g., a UE only supporting mMTC (massive machine type communication).

One possibility is that the vendor of the UE provides suitable information in the UE regarding the capability of the UE, e.g., such as the capability of the UE to monitor the PDCCH and process possible DCI messages. The UE capabilities will depend on the hardware and/or software of the UE, and can vary from UE to UE. In any case, it can be assumed that such information on the capability is stored in advance in the UE, e.g., by the vendor. Thus, the UE can determine the relevant capabilities for its operation in line with the operating system and the 3GPP standards.

The UE can provide information on the UE's capability for the PDCCH monitoring, which the gNB can then take into account when determining the search spaces and monitoring occasions. 5G NR has already reached some agreements, e.g., in 3GPP TS 38.306 v16.5.0, which is to be understood in the following as an example on how capability information can be informed by the UE to the gNB. Among other things, the UE can indicate a minimum time separation between PDCCH search space monitoring occasions that it supports. 3GPP TS 38.306 for instance defines the indication pdcch-Monitoring-r16 as part of the FeatureSetDownlink:

| Definitions for parameters | Per | IM | FDD-TDD DIFF | FR1-FR2 DIFF |
|---|---|---|---|---|
| pdcch-Monitoring-r16<br>Indicates whether the UE supports PDCCH search space monitoring occasions in any symbol of the slot with minimum time separation between two consecutive transmissions of PDCCH with span up to two OFDM symbols for two OFDM symbols or span up to three OFDM symbols for four and seven OFDM symbols. The different value can be reported for PDSCH processing type 1 and PDSCH processing type 2, respectively. For each sub-carrier spacing, the leading/leftmost bit (bit 0) corresponds to the supported value set (X, Y) of (7, 3). The next bit (bit 1) corresponds to the supported value set (X, Y) of (4, 3). The rightmost bit (bit 2) corresponds to the supported value set (X, Y) of (2, 2), | FS | No | N/A | N/A |

7, 8, 9, here exemplarily assuming a CORESET duration of 3 OFDM symbols.

The above exemplary explanation in connection with FIG. 7 only referred to a single search space set s, but can then be equally applied to the definitions of further search space sets, including common SS sets and UE-specific SS sets.

As defined by this capability parameter, the UE can indicate to the gNB its support, such that the PDCCH SS monitoring occasions (which span Y symbols) should be separated by at least X symbols. Therefore, the supported span Y of PDCCH search space monitoring occasions (in short PDCCH monitoring occasions) is either 2 or 3 consecutive OFDM symbols at most. On the other hand, the minimum separation between two spans is 2, 4 or 7 OFDM symbols and also applies across the boundary to the next consecutive PDCCH monitoring slot. The PDCCH monitoring spans are within a single slot; i.e., they do not cross a boundary of a PDCCH monitoring slot. The PDCCH minimum time separation of X symbols is between the first symbols of two consecutive spans, including across slot. The number of symbols of the span is up to Y.

This parameter pdcch-Monitoring-r16 is typically used for URLLC UEs where the UE needs to monitor and receive PDCCH more frequently (more than once per slot) to reduce the scheduling latency. As specified in section 10 of 3GPP TS 38.213, the parameter is only applicable for 15 kHz and 30 kHz subcarrier spacings.

Figure 8:
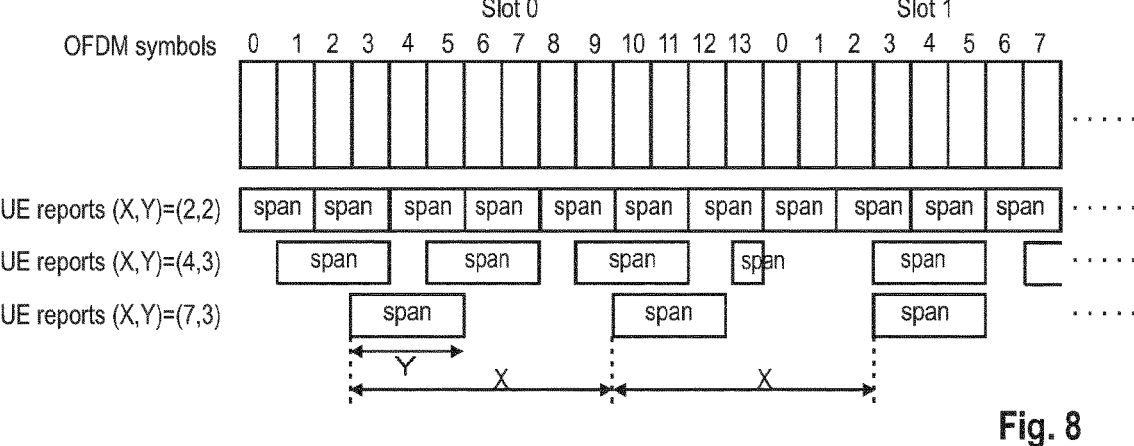
FIG. 8 illustrates different exemplary interpretations of different capability indications reported by the UE relating the minimum time separation between two consecutive transmissions of a PDCCH.

FIG. 8 illustrates an exemplary interpretation the different combinations of (X,Y) of the PDCCH monitoring indication within a slot in an exemplary manner. For instance, for the combination (2, 2), the UE basically can continuously monitor the slot. For illustration purposes, FIG. 8 includes spans having respectively a length of 2 OFDM symbols and complying with the minimum separation requirement of 2 OFDM symbols between the first symbols of two continuous spans.

FIG. 8 also illustrates possible spans for (X,Y)=(4, 3), exemplarily starting with OFDM symbol 1. The resulting spans could for instance occupy the OFDM symbols 1, 2, 3, 5, 6, 7, 9, 10, 11, and theoretically also OFDM symbol 13; the last span only occupies OFDM symbol 13, because the PDCCH monitoring spans should be contained within a single slot.

Considering that the minimum separation also applies across slots, the next three subsequent spans in the next slot could occupy OFDM symbols 3, 4, 5, 7, 8, 9, 11, 12 and 13, having respectively a length of 3 OFDM symbols and complying with the minimum separation requirement of 4 OFDM symbols. In the example of (4, 3), it was assumed for illustration purposes that the first span in the first slot could starts at OFDM symbol 1. However, although not illustrated in FIG. 8, the spans for (4, 3) could also start at a different OFDM symbol, such as OFDM symbol 0.

FIG. 8 also illustrates possible spans for (X,Y)=(7, 3), particularly two spans occupying OFDM symbols 3, 4, 5, 10, 11 and 12, having respectively a length of 3 OFDM symbols and complying with the minimum separation requirement of 7 OFDM symbols between the first symbol of two consecutive spans. The same spans are possible for the next slot. Again, other examples of spans are possible for the combination (7, 3), e.g., starting at other OFDM symbols.

For all combinations, the spans actually configured by the gNB could be shorter (e.g., have only one OFDM symbol) or could be separated further away.

Based on this PDCCH monitoring capability indication, the gNB can then configure e.g., the PDCCH monitoring occasions for the UE that satisfy the indicated PDCCH monitoring capabilities of the UE. The gNB can take into account the PDCCH monitoring capabilities of many UEs when configuring the search respective PDCCH monitoring occasions.

Figure 9:
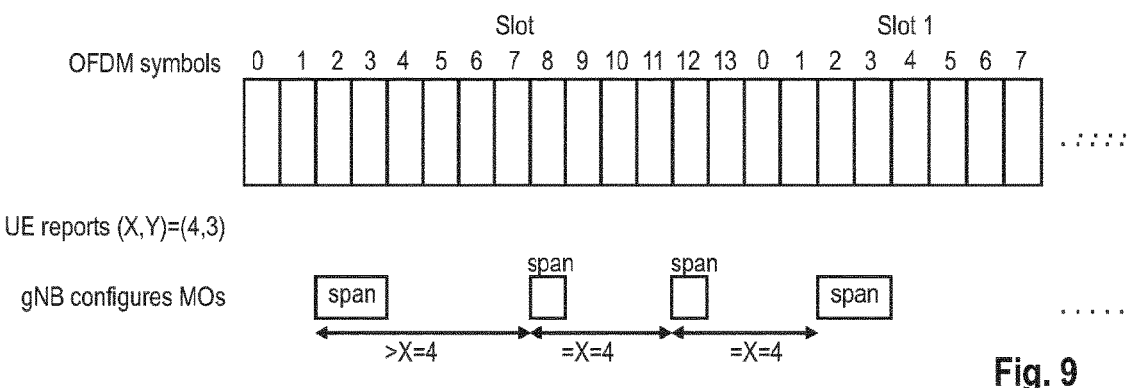
FIG. 9 illustrates an exemplary capability indication and one exemplary resulting configuration of monitoring occasions by the gNB.

FIG. 9 illustrates exemplarily the reporting of a specific PDCCH monitoring capability by the UE and the resulting PDCCH monitoring occasions configured by the gNB, that satisfy the reported capabilities. It is exemplarily assumed that the UE reports (X, Y)=(4, 3) as its PDCCH monitoring capability to the gNB. Based on this information, the gNB e.g., configures three PDCCH monitoring occasions in a first slot, the first MO in OFDM symbols 2 and 3, the second MO in OFDM symbol 8, and the third MO in OFDM symbol 12. For instance, the first MO would be associated with a CORESET of a duration of 2 OFDM symbols, while the second and third MOs would be associated with a CORESET of a duration of 1 OFDM symbol. In the second slot it is exemplarily assumed that the gNB configures at least a first MO occupying the OFDM symbols 2, and 3, with a separation of 4 OFDM symbols from the third MO of the previous slot. The three MOs in the first slot are respectively separated by 6 OFDM symbols between the first and second MO and 4 OFDM symbols between the second and third MO. Correspondingly, all the configured MOs comply with the indicated UE capabilities regarding minimum separation and length of the PDCCH monitoring.

Time-Domain in 5G NR

Figure 10:
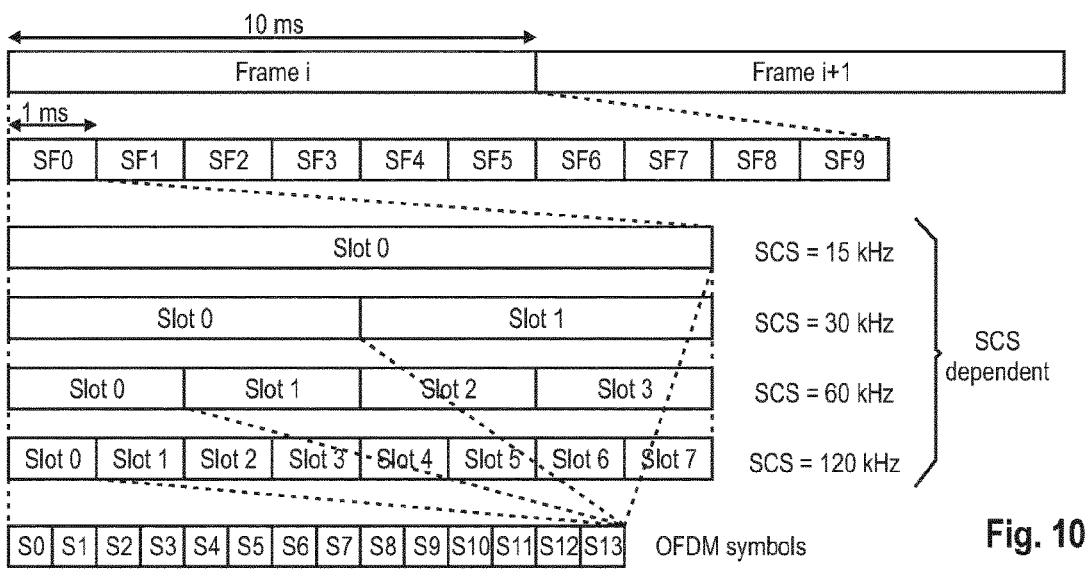
FIG. 10 illustrates an exemplary time-domain structure in a communication system, such as 5G NR, including radio frames, subframes, slots, and OFDM symbols for different subcarrier spacings.

In the time domain, transmissions in 5G NR are organized into frames of length 10 ms, each of which is divided into 10 equally sized subframes of length 1 ms. A subframe in turn is divided into one or more slots consisting of 14 OFDM symbols each. The duration of a slot in milliseconds depends on the numerology. For instance, for the 15 kHz subcarrier spacing, an NR slot thus has the same structure as an LTE subframe with normal cyclic prefix. A subframe in 5G NR serves as a numerology-independent time reference, which is useful, especially in the case of multiple numerologies being mixed on the same carrier, while a slot is the typical dynamic scheduling unit. This frame structure on which the 3GPP 5G NR communication is based in exemplarily illustrated in FIG. 10.

New Frequency Spectrum Above 52 GHz

5G NR so far operates in two frequency ranges, FR1 and FR2. Frequency range 1 (FR1) is from 450 MHz to 6 GHz and includes the LTE. Frequency range 2 (FR2) is from 24.25 GHz to 52.6 GHz. The sub-6 GHz range is the name for FR1, and the mmWave spectrum is the name for FR2.

The relatively underutilized millimeter-wave (mmWave) spectrum offers excellent opportunities to provide high-speed data rate, low latency, and high capacity due to the enormous amount of available contiguous bandwidth. However, operation on bands in frequencies above 52.6 GHz will be limited by the performance of devices, for example, poor power amplifier (PA) efficiency and larger phase noise impairment, the increased front-end insertion loss together with the low noise amplifier (LNA) and analog-to-digital converter (ADC) noise. In addition, bands in frequencies above 52.6 GHz have high propagation and penetration losses challenge. Even so, various use cases are envisioned for NR operating in frequencies between 52.6 GHz and 114.25 GHz.

3GPP is currently discussing the use of a higher subcarrier spacing, such as 480 kHz and 960 kHz for higher frequencies above 52.6 GHz, such as the frequency range of 52.6 GHz-71 GHz.

However, a higher SCS means a shorter symbol duration, and as a result a shorter slot duration. For instance, while one slot is 125 us for 120 kHz SCS, one slot is 31.25 us for a 480 kHz SCS and 15.625 us for a 960 kHz SCS.

Figure 11:
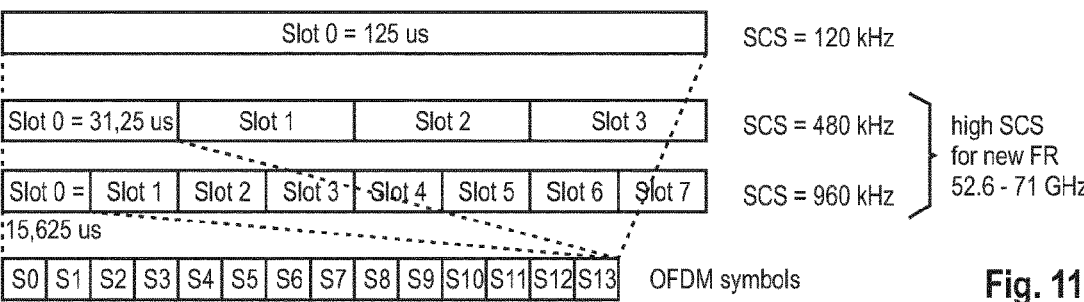
FIG. 11 illustrates the resulting slot lengths and OFDM symbols for high subcarrier spacings to be used in a new frequency range of 52.6-72 GHz.

FIG. 11 illustrates a comparison of a slot length for an SCS of 120 kHz and the corresponding slot lengths for SCS of 480 kHz and 960 kHz. Furthermore, a radio frame has 32 slots for an SCS of 480 kHz, and 64 slots for an SCS of 960 kHz, respectively with 14 OFDM symbols per slot having a correspondingly short OFDM symbol duration.

These shortened OFDM symbol and slot durations may require a high processing capability at the UE side. UEs according to Rel. 15 or Rel. 16 should be capable of processing PDCCH every slot (single-slot monitoring capability). On the other hand, not every UE might be able to process every slot within such a short time in the higher frequency ranges of 52.6-71 GHz. Furthermore, even if practically possible, requiring such a processing timeline would significantly increase the UE complexity and power consumption.

Therefore, 3GPP discusses for Rel. 17 the feasibility of allowing the UE to monitor the PDCCH only every multiple slots for 480/960 kHz SCS, multi-slot monitoring; in other words, the UE does not have to monitor every slot.
Further Improvements As presented above, one of the developments currently discussed in 3GPP relates to the multi-slot monitoring for high SCS and the high frequency range 52.6-71 GHz, which shall allow to reduce UE complexity and power consumption. However, for such a multi-slot monitoring, there is a potential drawback that the scheduling opportunities configured and used by the gNB are less, such that the scheduling flexibility is reduced for the gNB.

Figure 12:
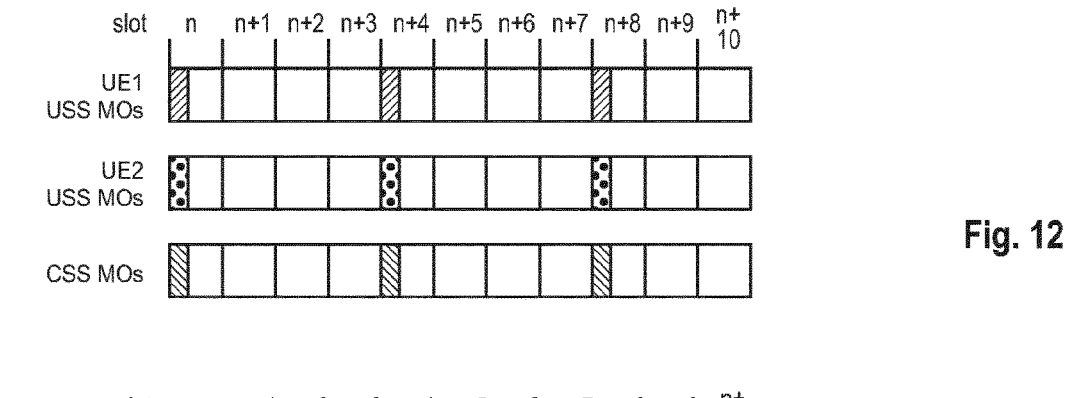
FIGS. 12 and 13 illustrate different configurations of monitoring occasions for UE-specific search spaces and common search spaces for two UEs and the resulting disadvantages.
Figure 13:
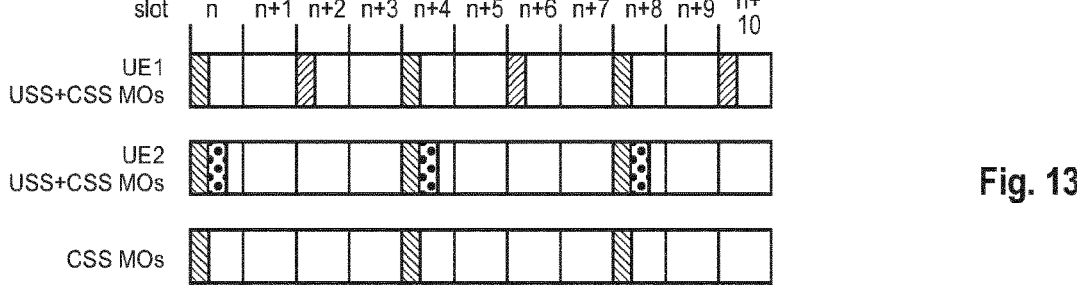

FIGS. 12 and 13 illustrate PDCCH monitoring occasions for two UEs, including monitoring occasions for a common SS (CSS) and a respective UE-specific SS (USS). In FIG. 12 it is exemplarily assumed that both UEs monitor only one PDCCH monitoring occasion, for both USS and CSS every 4 slots. Therefore, the gNB has to allocate the USS MOs for both UEs to the same location as the CSS MOs. In FIG. 12, the PDCCH monitoring is exemplarily assumed to be at the beginning of the slots, e.g., the first 2 or 3 OFDM symbols. The PDCCH monitoring complexity for a UE is rather low, because the UE only has to monitor one PDCCH monitoring occasion every 4 slots. However, the gNB might have to configure both CSS and USS of multiple UEs at the same monitoring occasions. This would significantly limit the number of UEs that can be scheduled by the gNB due to this resource constraint.

FIG. 13 assumes that both UE1 and UE2 monitor two PDCCH monitoring occasions every 4 slots, such that it is possible to configure the CSS and USS at different PDCCH monitoring occasions, rather than have to use a common PDCCH monitoring occasion as in FIG. 12. Correspondingly, the gNB scheduling flexibility increases compared to the scenario of FIG. 12. However, the UE requirements for the PDCCH monitoring increases. Furthermore, the PDCCH monitoring requirement would increase significantly if the two monitoring occasions are closely located together such as exemplarily assumed for UE2.

The inventors have identified the above-discussed potential drawbacks and challenges and have thus identified the possibility of providing an improved monitoring procedure of the PDCCH (downlink control channel) that allows avoiding or mitigating one or more of the above-identified problems. The present invention relates to different solutions and variants for such an improved downlink control channel monitoring procedure.

For instance, the improved downlink control channel monitoring procedure allows balancing the gNB scheduling flexibility and the UE PDCCH monitoring complexity.

Embodiments

In the following, UEs, base stations, and respective procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may, for example, be based at least on part thereof.

In general, it should be noted that many assumptions have been and are made herein so as to be able to explain the principles underlying the present disclosure in a clear, concise and understandable manner. These assumptions are however to be understood merely as examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the respective features and embodiments. Consequently, a skilled person is aware that the embodiments and their scope of protection should not be restricted to particular terms exemplarily used herein for lack of newer or finally agreed terminology, but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Communication between the UE and the base station is typically standardized and may be defined by different layers, such as PHY, MAC, RRC etc. (see above background discussion).

The expressions "monitoring occasion," "downlink control channel monitoring occasion," "PDCCH monitoring occasion" and similar expressions are to be understood broadly, e.g., as a period of time (e.g., a set of one or more consecutive symbols) of a slot where the UE is configured to monitor the PDCCH (e.g., according to PDCCH candidates). For example, the UE determines monitoring occasions for each search space set it is configured with.

The expression "span," "time span," "MO time span" and similar expressions are to be understood broadly as e.g., a number of consecutive symbols containing one or multiple monitoring occasions. Furthermore, in one optional implementation, each monitoring occasion is within one span, and further a span starts at a first symbol where a monitoring occasion starts and ends at a last symbol where a monitoring occasion (possibly a different MO than the first MO) ends.

The expression "search space set" can be broadly understood as a set of search spaces, with a plurality of search spaces, each search space comprising one or a plurality of possible candidates for receiving a DCI message. For instance, a search space groups various candidates with the same aggregation level but with a different format of the DCI message. In turn, for instance, the set of search spaces may then comprise search spaces of different aggregation levels, but being associated with a same set of time-frequency resources to be monitored (e.g., a same CORESET). Particular exemplary implementations of search space sets are given by the 3GPP 5G NR standards, as explained above.

The term "monitoring" can be broadly understood e.g., as the process of trying to decode a possible candidate for receiving a DCI message, e.g., based on a particular format. Such a decoding attempt can also be called blind decoding.

The expression "monitoring candidate" can be broadly understood as a particular candidate that is monitored by the UE within a monitoring occasion. In a particular exemplary implementation which is compliant with the 3GPP 5G NR standards, the "monitoring candidate" can be seen as the "PDCCH candidate."

For the following solutions it is exemplarily assumed that the improved downlink control channel monitoring procedure can be conceptually based on the PDCCH monitoring already defined according to 3GPP 4G or 5G standards, as explained above.

Figure 14:
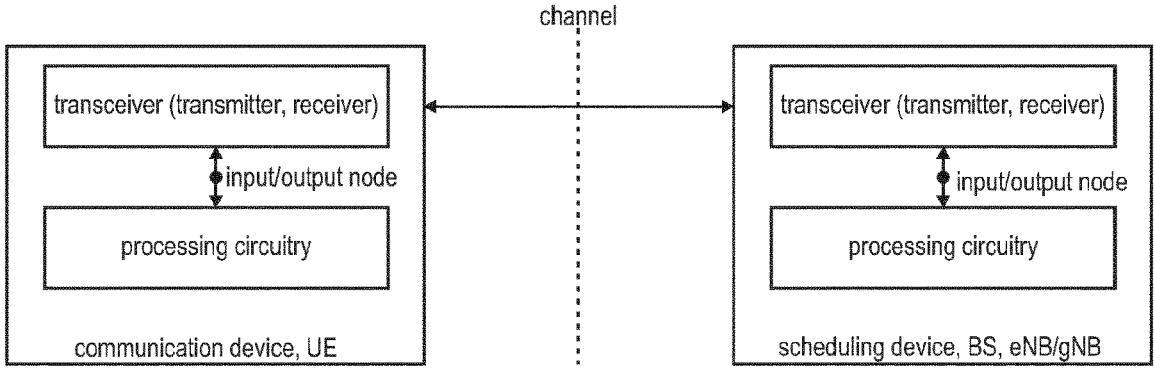
FIG. 14 is an exemplary and simplified structure of a UE and gNB.

FIG. 14 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Different solutions of an improved downlink control channel monitoring procedure will be described in the following. In said connection, improved UEs and improved base stations are presented, which participate in the improved downlink control channel monitoring procedures. Corresponding methods for the UE behavior and the base station behavior are provided as well.

Figure 15:
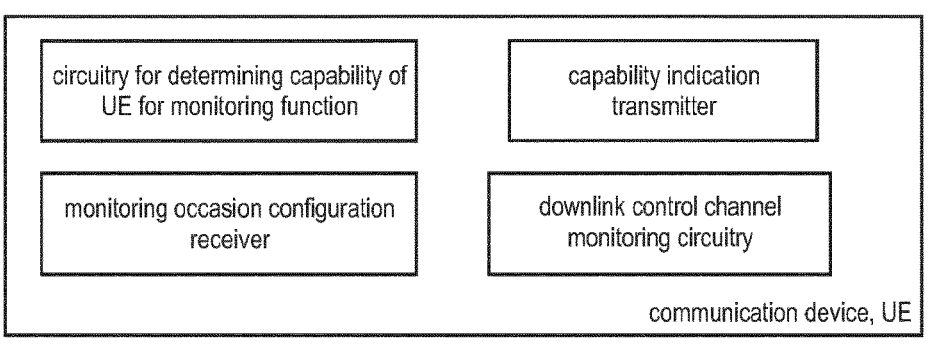
FIG. 15 illustrates a structure of the UE according to an exemplary implementation of an improved downlink control channel monitoring procedure.

FIG. 15 illustrates a simplified and exemplary UE structure according to an exemplary implementation of the improved downlink control channel monitoring procedure, which can be implemented based on the general UE structure explained in connection with FIG. 14. The various structural elements of the UE illustrated in said FIG. 15 can be interconnected between one another e.g., with corresponding input/output nodes (not shown) e.g., in order to exchange control and user data and other signals. Although not shown for illustration purposes, the UE may include further structural elements.

As apparent from FIG. 15, the UE may include circuitry for determining the capability of a UE for a monitoring function, a capability indication transmitter, a monitoring occasion configuration receiver, and a downlink control channel monitoring circuitry.

In the present case as will become apparent from the below disclosure, the receiver of the UE can thus be exemplarily configured to at least partly perform one or more of receiving a configuration message for configuring the monitoring function at the UE, receiving a downlink control information message on a downlink control channel, etc.

In the present case as will become apparent from the below disclosure, the processing circuitry of the UE can thus be exemplarily configured to at least partly perform one or more of determining one or more capabilities of the UE, such as the first and/or second capability conditions, determining monitoring occasions of a downlink control channel, etc.

In the present case as will become apparent from the below disclosure, the transmitter of the UE can thus be exemplarily configured to at least partly perform one or more of transmitting a capability indication to the base station, etc.

One exemplary procedure as will be disclosed in more detail further below is implemented by a UE that includes the following. A processor of the UE determines a capability of the UE for operating a monitoring function, wherein the monitoring function is operated by the UE for monitoring a downlink control channel in one or more monitoring occasions for the purpose of receiving a downlink control information message. The determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots, A transmitter of the UE transmits a capability indication to a base station, wherein the capability indication includes information on the determined capability of a UE for operating the monitoring function. The capability indication indicates the first capability condition of the UE and optionally includes the second capability condition of the UE. A receiver of the UE receives, from the base station, configuration information for configuring the monitoring function at the UE, wherein the configuration information configures one or more monitoring occasions in which the UE monitors the downlink control channel.

A corresponding exemplary method comprises the following steps performed by a UE:

determining a capability of the UE for operating a monitoring function, wherein the monitoring function is operated by the UE for monitoring a downlink control channel in one or more monitoring occasions for the purpose of receiving a downlink control information message, wherein the determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots, transmitting a capability indication to a base station, wherein the capability indication includes information on the determined capability of a UE for operating the monitoring function, wherein the capability indication indicates the first capability condition of the UE and optionally includes the second capability condition of the UE, receiving from the base station, configuration information for configuring the monitoring function at the UE, wherein the configuration information configures one or more monitoring occasions in which the UE monitors the downlink control channel.

Figure 16:
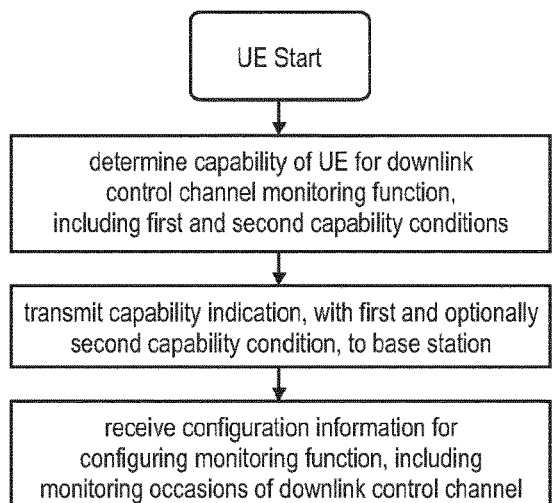
FIG. 16 is a flow diagram for the UE behavior, according to an exemplary implementation of the improved downlink control channel monitoring procedure.

A corresponding sequence diagram for an exemplary UE behaviour in line with the above-discussed UE and UE method is illustrated in FIG. 16. As apparent therefrom, the UE determines its own capability for operating the monitoring function for monitoring the downlink control channel and then transmits the indicated capability to the base station. The capability of the UE can involve two separate capability conditions (details see below). While both capability conditions are determined by the UE, the first one is always transmitted to the base station, while the second capability condition can be transmitted optionally. In response, the UE receives, from the base station, configuration information for configuring the monitoring function, including monitoring occasions of the downlink control channel. Although not illustrated in FIG. 16, the determined and indicated UE monitoring capability indicates one or both of a minimum span time gap between two consecutive time spans having a span length of one or more consecutive symbols, wherein each time span may contain one or more downlink control channel monitoring occasions, and a minimum group time gap between two consecutive groups of time spans within a grouping window having a length of one or more slots.

Some exemplary implementations of the improved downlink control channel monitoring procedure also involve the base station, to which the UE is currently connected (termed e.g., serving base station). Correspondingly, the improved downlink control channel monitoring procedure also provides an improved base station that participates therein.

FIG. 17 illustrates a simplified and exemplary base station structure according to an exemplary implementation of the improved downlink control channel monitoring procedure, and which can be implemented based on the general base station structure explained in connection with FIG. 14. The various structural elements of the base station illustrated in said FIG. 17 can be interconnected between one another e.g., with corresponding input/output nodes (not shown) e.g., in order to exchange control and user data and other signals. Although not shown for illustration purposes, the base station may include further structural elements.

As apparent therefrom, the base station comprises a capability indication receiver, a capability determination circuitry, circuitry for determining monitoring occasions, and a monitoring occasion configuration transmitter.

One exemplary procedure as will be disclosed in more detail further below is implemented by a base station that includes the following. A receiver of the base station receives, respectively from one or more user equipments, Ues, a capability indication, the capability indication indicating a capability of the UE for operating a monitoring function, wherein the monitoring function is operated by the UE for monitoring a downlink control channel in one or more monitoring occasions for the purpose of receiving a downlink control information message. The capability indication from each UE indicates a first capability condition as the capability of the UE:

the first capability condition regarding a minimum span time gap between two consecutive time spans having a span length of one or more consecutive symbols, wherein each time span may contain one or more monitoring occasions for the downlink control channel.

A processor of the base station determines a second capability condition of the one or more Ues regarding a minimum group time gap between two consecutive groups of time spans within a grouping window having a length of one or more slots, either from information indicated by the received capability indication or from stored information and a subcarrier spacing used by the respective UE for the downlink control channel. The processor determines, respectively for the one or more Ues, one or more monitoring occasions to be monitored on the downlink control channel, based on the first and second capability conditions determined for all of the one or more Ues. A transmitter of the base station transmits, to each of the one or more Ues, configuration information for configuring the monitoring function at the UE, including configuring one or more monitoring occasions, in which the respective UE monitors the downlink control channel.

A corresponding method comprises the following steps performed by the base station:

receiving, respectively from one or more user equipments, Ues, a capability indication, the capability indication indicating a capability of the UE for operating a monitoring function, wherein the monitoring function is operated by the UE for monitoring a downlink control channel in one or more monitoring occasions for the purpose of receiving a downlink control information message.

The capability indication from each UE indicates a first capability condition as a capability of the UE:

the first capability condition regarding a minimum span time gap between two consecutive time spans having a span length of one or more consecutive symbols, wherein each time span may contain one or more monitoring occasions for the downlink control channel, determining a second capability condition of the one or more Ues, regarding a minimum group time gap between two consecutive groups of time spans within a grouping window having a length of one or more slots, either from information indicated by the received capability indication or from stored information and a subcarrier spacing used by the respective UE for the downlink control channel, determining, respectively for the one or more Ues, one or more monitoring occasions to be monitored on the downlink control channel, based on the first and second capability conditions determined for all the one or more Ues, transmitting, to each of the one or more Ues, configuration information for configuring the monitoring function at the UE, including configuring one or more monitoring occasions, in which the respective UE monitors the downlink control channel.

A corresponding sequence diagram for an exemplary base station behavior in line with the above-discussed base station and corresponding method is illustrated in FIG. 18. The sequence diagram illustrates an exemplary and simplified implementation of the above presented base station method. As apparent therefrom, the base station receives from the UE(s) the capability indication regarding the UE monitoring function of the downlink control channel, wherein the capability indication can already indicate a first capability condition of the UE. The base station then determines the UE capabilities, from the received capability indication, and as a further option determines a second capability condition from stored information in combination with a subcarrier spacing that is used for the downlink control channel. Based on these determined UE monitoring capabilities, the base station determines suitable monitoring occasions for the downlink control channel, particularly complying with the UE monitoring capabilities. Then, the base station can transmit configuration information to the UE(s), for configuring monitoring occasions of the monitoring function for monitoring the downlink control channel.

FIG. 19 illustrates a simple and exemplary interaction between the improved UE and improved base station of the above discussed improved downlink control channel monitoring procedure. In this solution presented in FIG. 19, the interaction starts with the UE determining the capabilities of the UE, including the capabilities regarding a monitoring function for monitoring a downlink control channel. Details on the UE monitoring capabilities will be presented below and include one or more of a first and a second UE capability condition. The UE then sends information on the determined capabilities to the base station, e.g., in the form of a capability indication. Depending on the solution, the capability indication includes information on one or both of the first and second UE capability conditions. The base station determines the UE capabilities, e.g., from the received capability indication and optionally from stored information and the SCS, and then determines monitoring occasions of the UE monitoring function based on the previously determined UE monitoring capabilities. The base station then informs the UE about the determined downlink control channel monitoring occasions. The UE in turn determines the downlink control channel monitoring occasions based on the received configuration. The UE can thus operate the monitoring function as configured, and monitors the downlink control channel following the configured monitoring occasions. Therefore, the UE can receive downlink control information transmitted by the base station during the monitoring occasions of the downlink control channel.

The above present improved downlink control channel monitoring procedure, and the related Ues, base stations, are based on the use of capabilities of the UE, which are determined by the base station and the UE, and can be transmitted from the UE to the base station.

In the following, different solutions for which UE monitoring capabilities should be used for the improved downlink control channel monitoring procedure, will be presented.

First Solution

In a first solution of the improved downlink control channel monitoring procedure, these capabilities of the UE can be the following:

a minimum span time gap between two consecutive time spans having a span length of one or more consecutive symbols, wherein each time span may contain one or more monitoring occasions for the downlink control channel, and a minimum group time gap between two consecutive groups of time spans within a grouping window having a length of one or more slots.

This first solution thus relies at least a combination of two capability conditions (could also be termed capability requirements, or UE capability, or UE capability constraint, or UE capability limitation) that the monitoring occasions for the downlink control channel should both fulfil.

The first UE capability condition of this first solution relates to ensuring a minimum span time gap between two consecutive time spans that have a particular span length of one or more consecutive OFDM symbols. For instance, the minimum (as well as the actual) span time gap is defined to be located between an end of one time span and a start of the subsequent time span. A time span is to be understood as containing one or more monitoring occasions for the UE to monitor the downlink control channel. Put differently, two time spans are at least spaced apart by the minimum span time gap; while the time spans can be configured by the base station to include one or more downlink control channel monitoring occasions, the base station should configure the minimum span time gap to not include any monitoring occasion of the downlink control channel. The gNB should not expect the UE to monitor any monitoring occasion of the downlink control channel in the minimum span time gap. An exception to this rust UE capability condition is described later in relation to the overbooking mechanism that can be performed by the base station.

This minimum time span gap can be e.g., one or more OFDM symbols, up to one or more slots.

Thus, the above explained first UE capability condition ensures that the UE has some processing time after the monitoring occasion(s) of a time span for processing possible downlink control information received from the base station in those downlink control channel monitoring occasions of a time span, before having to perform the same processing for the next time span.

In the following, information on the second UE capability condition is provided.

The second UE capability condition of this first solution relates to ensuring a minimum group time gap between two consecutive groups of time spans within a grouping window that has a length of one or more slots. Put differently, each time span of a group (with one or more time spans) is within the grouping window of one or more slots; then, two consecutive groups, or two consecutive grouping windows, are to be spaced apart at least by a minimum time gap (e.g., called the minimum group time gap). For instance, the minimum group time gap is defined to be located between an end of one grouping window and a start of the subsequent grouping window.

An alternative second UE capability condition of the first solution could be defined as ensuring a minimum group time gap between two consecutive groups of downlink control channel monitoring occasions within a grouping window that has a length of one or more slots. This alternative second UE capability condition is quite similar, or basically equivalent, to the previously-mentioned second UE capability condition, when considering that both the grouping of time spans (having one or more monitoring occasions) and the grouping of monitoring occasions results in a grouping within the same grouping window. Also, the minimum group time gap will be the same for both the alternative and the previous second UE capability condition of the first solution.

Moreover, a combination of the minimum group time gap and the length of the grouping window can be defined as another window, which is always larger than the grouping window (i.e., by at least the minimum group time gap). Following the above definition of the second UE capability condition, monitoring occasions should only be configured by the base station within the grouping window, while no monitoring occasions should be configured by the base station within the minimum group time gap The gNB should expect the UE to monitor the monitoring occasions within the grouping window, but should not expect the UE to monitor the monitoring occasions within the minimum group time gap. An exception to this second UE capability condition is described later in relation to the overbooking mechanism that can be performed by the base station.

This larger window, comprising the grouping window and the minimum group time gap, could thus be called the multi-slot monitoring window, considering that a UE is not required to monitor all slots of this multi-slot monitoring window but rather at most the slots of the time span grouping window (see above discussion on Rel. 17 multi-slot monitoring). The multi-slot monitoring window could then be repeated in time, such that there are consecutive multi-slot monitoring windows without any additional gap in between the multi-slot monitoring windows.

Independently from the first UE capability condition, this second UE capability condition ensures that the UE has some processing time (e.g., at least a slot) after the monitoring occasions of the grouping window before the UE has to start processing monitoring occasions of the next grouping window (see also next multi-slot monitoring window).

By using additionally the second UE capability condition in the first solution to ensure some additional processing time for the UE, the r-st UE capability condition need not be as stringent, e.g., compared to the second solution (see below) which relies mainly on the first UE capability condition alone with however the more stringent condition that the minimum span time gap is at least one slot.

According to further variants of the second UE capability condition, there are several possibilities on where to position the grouping window within the larger multi-slot monitoring window. For instance, the grouping window can be at the beginning of the multi-slot monitoring window; i.e., the grouping window and the multi-slot monitoring window start with the same OFDM symbol. As a further example, the grouping window can be shifted from the start (e.g., be in the middle) of the larger multi-slot monitoring window, although still complying with the minimum group time gap until the start of the next grouping window. As a further example, the grouping window can be at the end of the larger multi-slot monitoring window. As long as the grouping window position with respect to the multi-slot monitoring window does not change over time (in other words, not floating), the minimum group time gap can be ensured.

The first UE capability condition can be indicated to the base station in various different manners. Generally, the first UE capability condition is indicated through information on the two parameters, the minimum span time gap (could be called parameter Q-P) and the length of the time span (could be called parameter P).

According to a first exemplary implementation of how to indicate the first UE capability condition to the base station, the minimum span time gap and the span length of the time spans can be indicated directly as corresponding values, such as a number of OFDM symbols. The capability indication for this first UE capability condition would thus comprise two values, respectively indicating the minimum span time gap (Q-P) and the span length of the time spans (P).

According to a second exemplary implementation of how to indicate the first UE capability condition to the base station, instead of signaling the minimum span time gap as in the first exemplary implementation, it is also possible to indicate a minimum span time separation (could be called parameter Q) between a start of one time span and a start of the subsequent time span. The minimum span time gap (Q-P) can be directly derived from the minimum span time separation and the time span length, e.g., by subtracting the time span length (P) from the minimum span time separation (Q), i.e., Q-P. Thus, the capability indication for the first UE capability condition would comprise two values, respectively indicating the minimum span time separation (Q) and the span length of the time spans (P).

A third exemplary implementation of how to indicate the first UE capability condition to the base station is based on indirectly indicating the relevant parameters, already presented above in the first and second exemplary implementations: i.e., the minimum span time gap (Q-P) and the span length (P) of the time spans of the first implementation, or the minimum span time separation (Q) and the span length (P) of the time spans of the second implementation.

In more detail, the capability indication indicates a combination of the minimum span time gap (or minimum span time separation) and the span time length. Correspondingly, a plurality of different combinations of the minimum span time gap (or minimum span time separation) and of span time lengths is defined in advance in the UE and the base station. For instance, a minimum span time gap of 10 OFDM symbols can be indicated together with a span length of 3 OFDM symbols, as (Q-P, P)=(10, 3). The UE then determines its first UE capability condition and selects one or more combinations that correspond to its capabilities.

The selected one or more combinations can then be indicated in the capability indication transmitted to the base station. For instance, the capability indication may include a bitmap, where each bit represents one possible combination (e.g., (Q,P)) for the first UE capability condition, and the bit value 1 means that the UE indicates that respective combination, and the bit value 0 means that the UE does not indicate that respective combination. In another variant, each combination can be unambiguously associated with an index, such that the capability indication includes one or more indices of the selected combination(s).

Independently from the above first to third implementations, the minimum span time gap (Q-P) (and also the minimum span time separation (Q)) can be indicated as one or more OFDM symbols, which allows a fine granularity of how the first UE capability condition can be determined and indicated. On the other hand, the minimum span time gap (Q-P) (and also the minimum span time separation (Q)) can be indicated as one or more slots, which allows to save bits for indicating the first UE capability compared to the above OFDM-symbol-based indication. For instance, it is assumed that for a high subcarrier spacing, a large minimum span time gap (Q-P) needs to be indicated. Thus, using slots rather than OFDM symbols would allow to reduce the number of bits necessary to indicate the minimum span time gap.

On the other hand, the span time length (P) can be indicated as one or more OFDM symbols, considering that the span duration could be short (e.g., the same as the duration of the CORESET) so as to reduce the monitoring effort of the UE for monitoring the downlink control channel during the monitoring occasions of a time span.

In a similar manner as described above for the first UE capability condition, the second UE capability condition can also be indicated to the base station in various different manners. Generally, the second UE capability condition is indicated through information on the two parameters, the minimum group time gap (could be called parameter N-M) and the length of the grouping window (could be called parameter M).

According to a first exemplary implementation of how to indicate the second UE capability condition to the base station, the minimum group time gap (N-M) and the grouping window length (M) can be indicated directly as corresponding values, such as a number of slots. The capability indication for this second UE capability condition would thus comprise two values, respectively indicating the minimum group time gap (N-M) and the grouping window length (M).

According to a second exemplary implementation of how to indicate the second UE capability condition to the base station, instead of signaling the minimum group time gap as in the first exemplary implementation, it is also possible to indicate a minimum group time separation (could be called N) between the start of one grouping window and the start of the subsequent grouping window. The minimum group time gap (N-M) can then be directly derived from the minimum group time separation (N) and the grouping window length (M), e.g., by subtracting the grouping window length (M) from the minimum group time separation (N), i.e., N-M. Thus, the capability indication for the second UE capability condition would comprise two values, respectively indicating the minimum group time separation (N) and the grouping window length (M).

The minimum group time separation and the grouping window length could be indicated respectively as a number one a more slots.

A third exemplary implementation of how to indicate the second UE capability condition to the base station is based on indirectly indicating the relevant parameters, already presented above in the first and second exemplary implementations: the minimum group time gap (N-M) and the grouping window length (M) for the first exemplary implementation, or the minimum group time separation (N) and the grouping window length (M) of the second exemplary implementation.

In more detail, the capability indication indicates a combination of the minimum group time gap (or minimum group time separation) and the grouping window length. Correspondingly, a plurality of different combinations of the minimum group time gap (or minimum group time separation) and of grouping window lengths is defined in advance in the UE and the base station. For instance, a minimum group time gap of 2 slots can be indicated together with a grouping window length of 2 slots, as (N-M, M)=(2, 2). The UE then determines second UE capability condition and selects one or more combinations that correspond to its capabilities.

The selected one or more combinations can then be indicated in the capability indication transmitted to the base station. For instance, the capability indication may include a bitmap, where each bit represents one possible combination (e.g., (N, M) for the second UE capability condition, and the bit value 1 means that the UE indicates that respective combination, and the bit value 0 means that the UE does not indicate that respective combination. In another variant, each combination can be unambiguously associated with an index, such that the capability indication includes one or more indices of the selected combination(s).

According to a further implementation of the second UE capability condition, the second UE capability condition additionally requires a maximum number of time spans within each group of time spans. As an alternative, the second UE capability additionally requires a maximum number of monitoring occasions within a group. Put differently, the second UE capability does not only define the grouping window length and the minimum group time gap, but also sets an upper limit to the number of time spans/ monitoring occasions that the UE is able to process/support within the grouping window.

Therefore, the UE can further reduce its processing demand, since it has to process downlink control information received only from the maximum number of time spans/monitoring occasions.

In addition or alternatively to the above described indication of the second UE capability condition, other implementations of the first solution of the improved downlink control channel monitoring procedure do not rely on such a transmission of the second UE capability from the UE to the base station. Instead, the second UE capability condition is determined separately by the UE and the gNB, e.g., respectively based on stored information and a subcarrier spacing of the downlink control channel. In particular, the UE and gNB have information stored in advance that includes an association between different subcarrier spacings and different second UE capability conditions; wherein the associated second UE capability can be one of the above explained implementations e.g., a combination of the minimum group time gap and the grouping window length, or a combination of the minimum group time separation and the grouping window length, or can additionally include the maximum number of time spans/monitoring occasions within each group of time spans/monitoring occasions.

For instance, a combination of a grouping window length of two slots and a minimum group time gap of two slots (2,2) can be associated with a subcarrier spacing of 480 kHz. As another example, a combination of a grouping window length of 3 slots and a minimum group time gap of 5 slots (3,5) can be associated with a subcarrier spacing of 960 kHz. Both the UE and the base station would thus determine the same second UE capability condition for a downlink control channel that uses the SCS of 480 kHz or 960 kHz.

In one example, the stored information with the associations between the subcarrier spacing and the second UE capability can be determined in advance by the base station and provided to the UE, e.g., in system information or in a message dedicated to the UE (e.g., message of the RRC protocol). Thus, the same stored information could apply to all Ues in a radio cell. Alternatively, the stored information can be defined by a 3GPP standard and thus be e.g., part of the operating system of the UE and base station. According to a further alternative, the stored information can be defined by an operator of the UE, and thus be provided as subscriber information, e.g., in the SIM card (or e-SIM information) of the UE.

According to one exemplary implementation of this first solution of the improved downlink control channel monitoring procedure, the capability indication pdcch-rmonitoring-r16 explained above as being already defined in 3GPP TS 38.306 could be used as a basis for the first UE capability condition. In particular, the pdcch-monitoring-r16 indication defines different combinations of parameters X (separation of two consecutive time spans) and Y (length of a time span). The very same pdcch-monitoring-16 indication can be reused, thus allowing an indication of three different combinations $(X,Y)=(2,2)$, (4,5) or (7,3), as the first UE capability condition of the first solution. The parameter X of the pdcch-monitoring-16 indication would correspond to the minimum time span separation (Q), and the parameter Y of the pdcch-monitoring-16 indication would correspond to the span time length (P). Alternatively, the pdcch-monitoring-r16 indication could be extended to also indicate further combination, such as (10,2), (14,2), (10,3), (14,3), as the first UE capability condition combination (Q, P) of the first solution.

According to one exemplary implementation of this first solution of the improved downlink control channel monitoring procedure explained above and below, the first and second UE capabilities are specific to a particular scenario, such as the high SCS and the new frequency range discussed in the background section. For instance, the first and second UE capabilities could primarily be only applied for a subcarrier spacing of the downlink control channel higher than 120 kHz, e.g., a subcarrier spacing of 480 kHz and/or 960 kHz. In addition or alternatively, the first and second UE capability conditions could primarily be only applied for the new frequency range above 52.6 GHz, e.g., the frequency range of 52.6 GHz to 71 GHz.

As explained in connection with the background section, the high subcarrier spacing, to be used in connection with the new high frequency range, results in a short duration of slots and OFDM symbols, with the resulting increase in the requirements on the downlink control channel monitoring processing by the UE.

Figure 20:
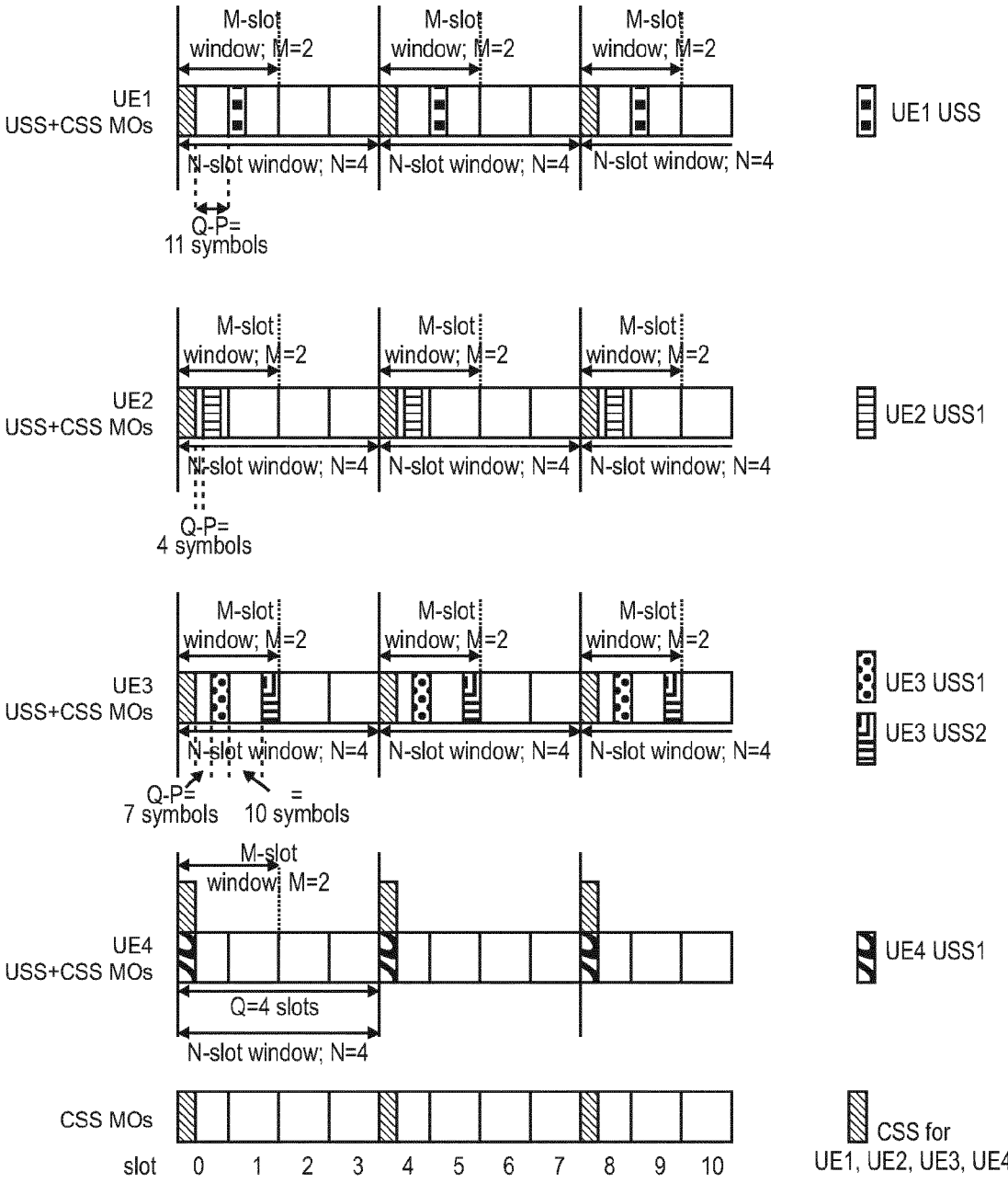
FIG. 20 illustrates an exemplary determination of various monitoring occasions for different UEs for a first solution.

FIG. 20 illustrates an exemplary determination of various monitoring occasions for four different Ues, UE1, UE2, UE3 and UE4. It is exemplarily assumed that both UE capability conditions are to be complied with by the monitoring conditions. It is exemplarily assumed that the common search space (common to Ues UE1, UE2, UE3, UE4) has a periodicity of 4 slots. The monitoring occasions in slots 0, 4 and 8 for the common search space CSS are illustrated at the bottom of FIG. 20.

It is exemplarily assumed that all four UEs are to comply with the second UE capability condition that there is a minimum group time gap of 2 slots (N-M=2 slots) between two consecutive groups of time spans within a grouping window of length 2 slots (M=2 slots).

Furthermore, UE1 has to comply with a first UE capability condition according to a minimum span time gap (Q-P) of 11 symbols with a span length of 3 symbols; i.e., (Q,P)=(14, 3). UE2 has to comply with a first UE capability condition according to a minimum span time gap (Q-P) of 4 symbols with a span length of 3 symbols; i.e., (Q,P)=(7, 3). UE3 has to comply with a first UE capability condition according to a minimum span time gap (Q-P) of 7 symbols with a span length of 3 symbols; i.e., (Q,P)=(10, 3).

Further, UE4 is exemplarily assumed to have as the first UE capability restriction that UE4 is able to monitor PDCCH monitoring occasions satisfying a minimum span time separation of 4 slots, Q=4 slots. Therefore, since the CSS has a periodicity of 4 slots, the gNB configures the monitoring occasions for the UE-specific search space of UE4 with a periodicity of 4 slots*X (where X is an integer equal or larger than 1) and co-located with the CSS Mos. In FIG. 20, it is assumed that the USS of UE4 has a periodicity of 4 slots too. In order to illustrate the co-location of the CSS Mos and the USS Mos for UE4, the CSS Mos are illustrated above the USS Mos. Furthermore, it is exemplarily assumed that UE1, UE2, and UE4 have one UE-specific search space, while UE3 has two UE-specific search spaces.

In this example, UE2 could indicate a maximum of two Mos per grouping window, so as to further limit the monitoring processing. This is particularly useful in scenarios where the minimum span time gap is small, and e.g., the grouping window is long.

An exemplary result of a possible configuration of monitoring occasions for the four Ues is illustrated in FIG. 20. As apparent therefrom, the USS and CSS monitoring occasions for UE1 are grouped within the grouping window having a length of 2 slots, wherein the CSS and USS Mos are spaced apart by the minimum span time gap of 11 symbols. In effect, the CSS MO and the USS MO are respectively at the beginning of the two slots of the grouping window.

Similarly, the USS and CSS monitoring occasions for UE2 are grouped within the grouping window having a length of two slots. The CSS and USS Mos are spaced apart by the minimum span time gap of 4 symbols. The three USS and CSS monitoring occasions for UE3 are grouped as well within the grouping window of two slots. Both gaps, i.e., between the CSS MO and the first USS, and between the first USS and the second USS, are spaced apart sufficiently, at least by the minimum span time gap of 7 symbols.

The third and fourth slots of the N-slot window for all Ues do not contain monitoring occasions and could thus be used by the UE to finish the processing related to the monitoring occasions of the first two slots or to save power.

Due to the more advanced first UE capability of UE1, UE2, and UE3, compared to UE4, the monitoring occasions for the different search spaces can be staggered, such that they do not need to be co-located. Correspondingly, the gNB has more flexibility in scheduling the downlink control channel. This is especially useful in higher frequency ranges, and also when using analogue beamforming.

Furthermore, UE3 has a higher capability because it allows three monitoring occasions (rather than only two monitoring occasions for UE1, UE2, and UE4) within the grouping window, thus affording the gNB even further flexibility in scheduling the downlink control channel.

Second Solution

In another second solution of the improved downlink control channel monitoring procedure, the capabilities of the UE can be the following:

a minimum span time gap between two consecutive time spans having a span length of one or more consecutive symbols, wherein each time span may contain one or more monitoring occasions for the downlink control channel, wherein the minimum span time gap is indicated in terms of one or more slots.

This second solution thus relies mainly on one capability condition, which is similar to the first UE capability condition of the first solution, but which is more stringent in that the minimum span time gap is at least one slot. Therefore, the first UE capability condition of this second solution affords the UE with at least some processing time (at least a slot) to monitor and process the monitoring occasion(s) of a time span, e.g., processing possible downlink control information received from the base station, before having to perform the same processing for the next time span.

Apart from the additional more stringent aspect that the minimum span time gap is at least one slot, the first UE capability condition for this second solution can be the same as explained in detail for the first solution. The first UE capability condition of the first solution allowed shorter minimum span time gaps of only a few OFDM symbols, while the first UE capability condition of the second solution always ensures a minimum span time gap of 1 slot. Therefore, implementations relating to the first UE capability condition explained already in detail in connection with the first solution apply equally to this second solution.

For instance, the different manners of how to indicate the first UE capability condition from the UE to the base station can be exactly the same as described for the first solution, e.g., following the first exemplary implementation of directly indicating values of the parameters Q-P and P, following the second exemplary implementation of directly indicating the parameters Q and P, and following the third exemplary implementation of indirectly indicating the parameters through a combination of the parameters, such as the combination (Q-P,P) or (Q,P).

Furthermore, also the second solution can make use of the capability indication pdcch-monitoring-r16 explained above already defined in 3GPP TS 38.306. This pdcch-monitoring-r16 could be extended to also indicate further combinations, such as (28, 2), (28, 3), (42, 3) etc., that allow a more stringent first capability condition combination (Q,P) for the second solution.

Again, as explained in detail for the first solution, also the first UE capability condition of this second solution can be defined as being specific to a particular scenario, such as the high SCS and/or the new frequency range, e.g., for being applied only for a subcarrier spacing of the downlink control channel higher than 120 kHz, e.g., 480 kHz and 960 kHz. In addition, the first UE capability condition of this second solution can be defined to be applied only for the new frequency range above 52.6 GHz, e.g., the frequency range of 52.6 GHz to 71 GHz.

Figure 21:
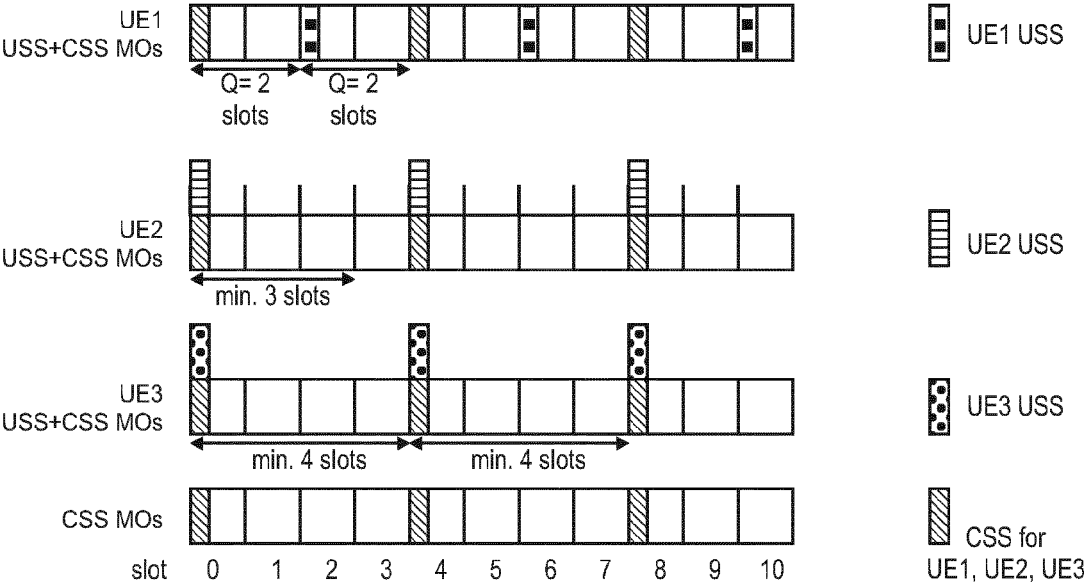
FIG. 21 illustrates an exemplary determination of various monitoring occasions for different UEs for a second solution.

FIG. 21 illustrates an exemplary determination of various monitoring occasions for three different UEs, UE1, UE2, and UE3. It is exemplary assumed that the common search space (common to UEs UE1, UE2, UE3) has a periodicity of 4 slots. The monitoring occasions in slots 0, 4, and 8 for the common search space CSS are illustrated at the bottom of FIG. 21.

It is exemplary assumed that UE1 has to comply with a first UE capability condition according to a minimum span time separation Q of 2 slots; similarly this could mean that the minimum span time gap Q-P=1 slot (not illustrated in FIG. 21). Correspondingly, for UE2 the first UE capability condition is a minimum span time separation Q of 3 slots (e.g., Q-P=2 slots), and for UE3 the first UE capability condition is a minimum span time separation Q of 4 slots (e.g., Q-P=3 slots).

An exemplary result of a possible configuration of monitoring occasions for the three UEs is illustrated in FIG. 21. In FIG. 21, it is assumed that the USS of UE3 has a periodicity of 4 slots too. Since the CSS has a periodicity of 4 slots, the gNB configures the monitoring occasions for the UE-specific search space for UE3 with a periodicity of 4 slots*X (where X is an integer equal or larger than 1) and co-located with the CSS MOs. In order to illustrate the co-location of the CSS MOs and the USS MOs for UE3, the USS MOs are illustrated above the CSS MOs.

Similar to UE3, the CSS and USS for UE2 are collocated so as to be able to comply with the minimum span time separation of at least 3 slots. As apparent therefrom, the CSS and USS for UE1 are respectively spaced apart sufficiently, complying with the minimum span time separation of 2 slots.

Third Solution

In another third solution of the improved downlink control channel monitoring procedure, the capability of the UE can be the following:

a minimum group time gap between two consecutive groups of time spans within a grouping window having a length of one or more slots.

Therefore, put differently, the third solution is based on the second UE capability condition of the first solution alone. In one example, the very same second UE capability condition as for the first solution can be used. Apart from not necessarily using the first UE capability condition of the first solution, the rest of the first solution can stay the same, for this third solution.

Therefore, implementations relating to the second UE capability condition explained already in detail in connection with the first solution apply equally to this third solution.

For instance, the grouping window can be positioned in various different manners within the larger multi-slot monitoring window, e.g., at the beginning, in the middle or at the end, while complying with the minimum group time gap.

Furthermore, the different manners of how to indicate the second UE capability condition from the UE to the base station can be exactly the same as described for the first solution, e.g., following the first exemplary implementation of directly indicating values of the parameters N-M and M, following the second exemplarily implementation of directly indicating the parameters N and M, and following the third exemplary implementation of indirectly indicating the parameters through a combination of the parameters, such as the combination (N-M, M) or (N, M).

In addition, also the third solution could extend the second UE capability as explained in detail for the first solution to also require a maximum number of time spans within each group of time spans, or alternatively to also require a maximum number of monitoring occasions within a group of monitoring occasions.

Moreover, also the third solution, as explained in detail for the first solution, could not require the transmission of the second UE capability from the UE to the base station. Rather, the second UE capability could be determined separately by the UE and the gNB, based on stored information and a subcarrier spacing used for the downlink control channel.

Again, as explained in detail for the first solution, also the second UE capability condition of this third solution can be defined as being specific to a particular scenario, such as the high SCS and/or the new frequency range, e.g., for being applied only for a subcarrier spacing of the downlink control channel higher than 120 kHz. e.g., 480 kHz and 960 kHz. In addition, the second UE capability condition of this third solution can be defined to be applied only for the new frequency range above 52.6 GHz, e.g., the frequency range of 52.6 GHz to 71 GHz.

Figure 22:
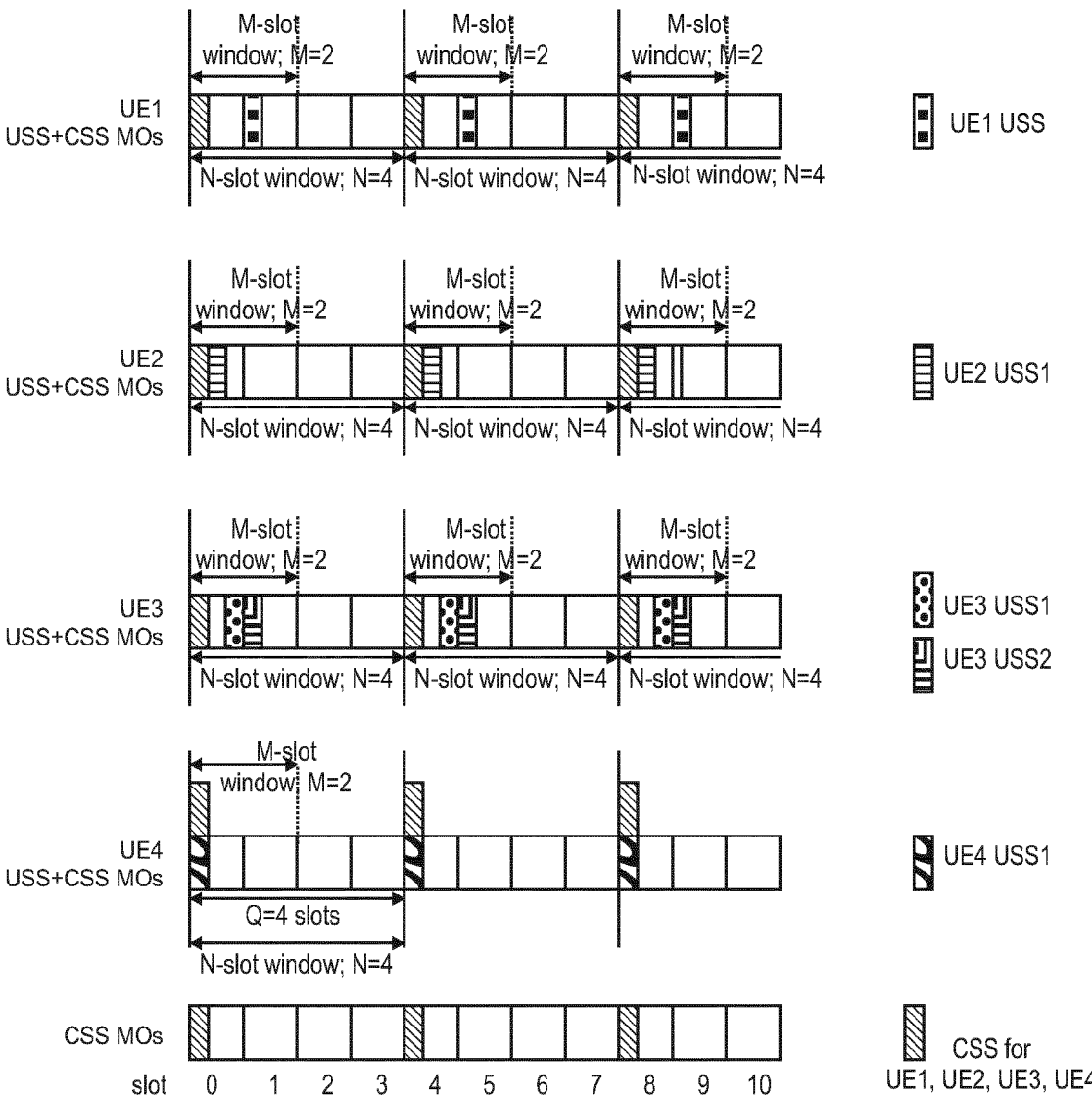
FIG. 22 illustrates an exemplary determination of various monitoring occasions for different UEs for a third solution.

FIG. 22 illustrates an exemplary determination of various monitoring occasions for four different UEs, UE1, UE2, UE3 and UE4. It is exemplary assumed that the common search space (common to UEs UE1, UE2, UE3, UE4) has a periodicity of 4 slots. The monitoring occasions for the common search space CSS are illustrated at the bottom of FIG. 22.

It is exemplarily assumed that all four UEs are to comply with the second UE capability condition that there is a minimum group time gap of 2 slots (N-M=2 slots) between two consecutive groups of time spans within a grouping window of length 2 slots (M=2 slots).

Furthermore, compared to the example of FIG. 20 for the first solution, the first UE capability condition has not to be complied with, such that the respective time spans/MOs within the grouping window (of 2 slots) can but need not be spaced apart from one another at all. The monitoring occasions for the CSS and the USS1 of UE2 are not spaced apart within the grouping window, but are rather directly subsequent to one another, without any gap in between. Similarly, the two USS1 and USS2 of UE3 are not spaced apart within the grouping window but are rather directly subsequent to one another, without any gap in between. On the other hand, although not required by a first UE capability condition, the CSS and USS of UE 1 are spaced apart, and also the CSS and the first USS of UE3 are spaced apart.

Some of the different implementations of the improved downlink control channel monitoring procedure explained above and below in connection with the first, second and third solutions are based on the definition of time spans. An exemplary definition of a time span is that it is a number of consecutive symbols containing one or multiple monitoring occasions of the downlink control channel. The time span starts with a first symbol of a monitoring occasion and ends with a last symbol of a monitoring occasion, which can, but need not, be the same monitoring occasion with which the time span starts, Furthermore, each monitoring occasion could be completely within one time span.

The different implementations of the improved downlink control channel monitoring procedure explained above and below in connection with the first, second and third solutions involve that the UE and the base station determine monitoring occasions in which the UE monitors the downlink control channel.

As explained above, the determination of the downlink control channel monitoring occasions can take into account the above discussed UE capabilities. In more detailed exemplary implementations, the UE and base station can apply mapping rules based on the search spaces and search space sets that the UE is configured with, particularly mapping PDCCH candidates to the monitoring occasions of search space sets following the mapping rules.

One mapping rule is that PDCCH candidates in monitoring occasions associated with common search spaces are to be mapped first. Then, PDCCH candidates in monitoring occasions associated with UE-specific search space sets are determined next, e.g., in an ascending order of indexes assigned to the UE-specific search space sets.

A limitation to this mapping process is provided by the maximum number of blind decoding attempts (e.g., number of PCCH candidates) and CCE limits with which the UE can be configured. Consequently, if the UE reaches the maximum number of blind decoding attempts or the maximum number of CCEs, the UE stops and does not map further PDCCH candidates to monitoring occasions of UE-specific search space sets.

A further limitation to the mapping process is then provided by the above discussed UE capability conditions. For instance, if the UE and gNB determine that a monitoring occasion for a particular search space set (e.g., a USS set) would not comply with one of the above discussed UE capability conditions (see first, second or third solutions), the UE and gNB are then allowed to skip mapping the whole search space set with this non-complying monitoring occasion (i.e., all monitoring occasions of that search space set) or to skip mapping the non-complying monitoring occasion only (such that the UE and gNB can still map other monitoring occasions of that search space set for the UE). In case that the monitoring occasion(s) instead of whole search space set is skipped, the skipping can be performed on per grouping window basis if the second condition applies. For example, all monitoring occasions within a grouping window that are associated the concerned search space set are skipped.

The above discussed skipping (or dropping) mechanism can be applied equally by the UE and the gNB, with the additional advantage that both entities have the same and common understanding on the available monitoring occasions of the downlink control channel such that the UE is able to receive downlink control information transmitted from the gNB.

In addition or independently from the above skipping mechanism performed by both the UE and the gNB, the gNB can apply an overbooking mechanism when determining the monitoring occasions for the downlink control channel. In particular, when determining a situation where a monitoring occasion that is to be mapped in line with a search space set does not comply with one or more of the above discussed UE capability conditions, that non-complying monitoring occasion is still configured despite not complying with the UE capability. Consequently, the gNB is allowed to configure the UE with a number of monitoring occasions that exceed the UE capability.

The skipping mechanism and also the overbooking mechanism facilitate the determination of monitoring occasions at the gNB side, because it allows to not strictly follow the UE capabilities. Moreover, since monitoring occasions for different search spaces may have different periodicities, the overbooking and skipping mechanisms facilitate the gNB to use the UE capabilities to their maximum.

Figure 23:
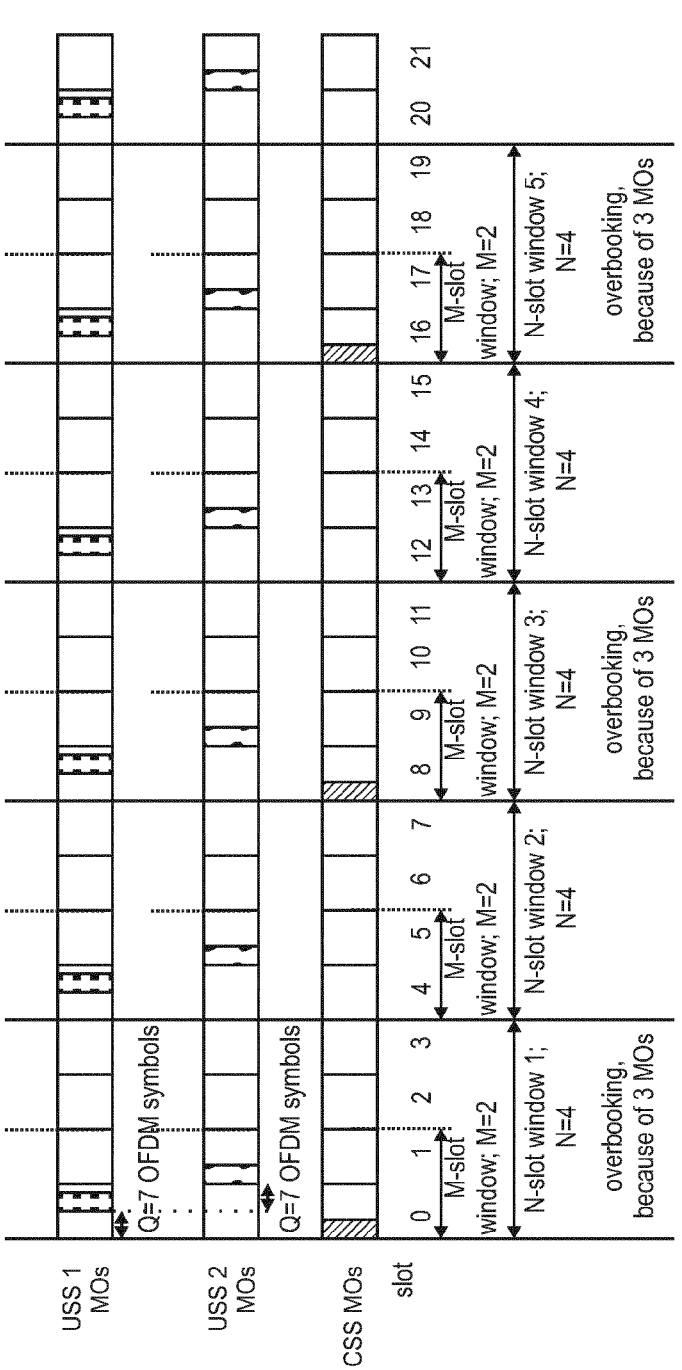
FIG. 23 illustrates an example on how an overbooking mechanism can be applied.

FIG. 23 illustrates an example on how the above discussed overbooking mechanism can be applied. It is assumed that the monitoring occasions for the downlink control channel have to comply with the following first and second UE capability conditions. According to the first UE capability condition, the UE supports a minimum span time separation Q of 7 OFDM symbols for a time span P of 3 OFDM symbols, i.e., a minimum span time gap (Q-P) of 4 OFDM symbols. Furthermore, according to the second UE capability condition, the UE supports a maximum number of two monitoring occasions within a grouping window of length M=2 slots, having a minimum group time separation N of 4 slots (resulting in a minimum group time gap N-M of 2 slots).

There are two UE-specific search spaces and a common search space for which monitoring occasions need to be configured. The gNB and UE can follow e.g., the above-discussed mapping rules, such that monitoring occasions (and e.g., the PDCCH candidates) for the CSS with a periodicity of 8 slots are configured first. A resulting configuration of the CSS MOs is illustrated in the bottom row of FIG. 23.

Then, the monitoring occasions (and e.g., the PDCCH candidates) for the first USS1 are determined, where USS1 is assumed to have a periodicity of 4 slots. The USS1 MOs are determined such that the first UE capability condition of Q=7 OFDM symbols is fulfilled. Correspondingly, the top row of FIG. 23 illustrates the monitoring occasions for USS1.

Next, the monitoring occasions for the USS2 with the subsequent index are to be determined, where USS2 also has a periodicity of 4 slots. There is thus the problem that it would not be possible to comply with the requirement that at most 2 MOs are to be present in a grouping window, because at least for some grouping windows there would be 3 MOs, i.e., CSS, USS1 and USS2 (e.g., in N-slot windows 1, 3 and 5 of FIG. 23).

One way to handle this situation would be to skip the whole USS2 completely, such that only CSS MOs and USS1 MOs (and e.g., the corresponding PDCCH candidates) would be determined for this UE. This is the worst-case scenario, where the first and second UE capability conditions are followed strictly, not allowing any overbooking and skipping.

Another way to handle this situation would be to apply the overbooking and to skip only those monitoring occasions that do not comply with the second UE capability condition, i.e., skipping the USS2 MO in N-slot windows 1, 3, and 5 (i.e., OFDM symbols 1, 9, and 17), while determining the USS2 MOs for N-slot windows 2 and 4 (in slots 5 and 13), etc. Such a solution would not be possible without the overbooking and skipping mechanisms explained above.

A further exemplary improvement on how the monitoring occasions can be determined according to the above discussed UE capability conditions is explained in the following, and revolves around the idea that these UE capability conditions do not apply to all search spaces, but rather to only some of the search spaces for which monitoring occasions are to be determined. Put differently, the UE capability conditions (see first, second or third solutions above) need not be applied when determining monitoring occasions for some search spaces, but should be applied when determining monitoring occasions for the remaining search spaces.

According to one exemplary implementation, a first set of search spaces, to which the UE capability conditions should not be applied, comprises those common search spaces that are configured for all UEs in a cell. Moreover, the UE should apply the UE capability conditions when determining monitoring occasions for UE-specific search spaces, for common search spaces that are configured in a dedicated message to the UE and for common search spaces that are configured commonly for a group of UEs.

In an 5G NR compliant implementation of the improved downlink control channel monitoring procedure, the Type1-PDCCH common search space of 5G NR (see above background section) is a common search that can be configured in a dedicated message to the UE (RRC) and to which the UE capability conditions can be applied by UE and base station. Further, the Type3-PDCCH common search space is a group-common search space (i.e., a common search space assigned to a group of UEs, e.g., not necessarily to all UEs) and to which the UE capability conditions can be applied by UE and base station. Conversely, the UE is thus not required to apply the UE capability conditions to a Type1-PDCCH common search space that was not configured in a dedicated RRC message, to a Type0, Type0A and Type2 common search space.

In one example, the UE can be required to monitor the Type1-PDCCH common search space that was not configured in a dedicated RRC message, the Type0, Type0A and Type2 common search spaces at any symbol with a given duration.

According to the above exceptions, the scheduling flexibility of the base station is further enhanced, because the base station does not need to align the monitoring occasions of some of the search spaces (e.g., the USS) with the monitoring occasions of certain common search spaces (e.g., those common to all UEs in a cell).

The different implementations of the improved downlink control channel monitoring procedure explained above and below in connection with the first, second and third solutions involve that the base station transmits configuration information to the UE for configuring the monitoring function at the UE. According to one example compliant with the 5G NR standard, this process can be done based on the above discussed information elements ControlResourceSet and SearchSpace, as e.g., discussed above following the definitions in 3GPP TS 38.331 v16.5.0 section 6.3.2.

Further Aspects

According to a first aspect, a user equipment, is provided that includes the following. A processor of the UE determines a capability of the UE for operating a monitoring function, wherein the monitoring function is operated by the UE for monitoring a downlink control channel in one or more monitoring occasions for the purpose of receiving a downlink control information message. The determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots, A transmitter of the UE transmits a capability indication to a base station, wherein the capability indication includes information on the determined capability of a UE for operating the monitoring function. The capability indication indicates the first capability condition of the UE and optionally includes the second capability condition of the UE. A receiver of the UE receives, from the base station, configuration information for configuring the monitoring function at the UE, wherein the configuration information configures one or more monitoring occasions in which the UE monitors the downlink control channel.

According to a second aspect provided in addition to the first aspect, a time span is a number of consecutive symbols containing one or multiple monitoring occasions of the downlink control channel. Each monitoring occasion is completely within one time span, wherein the time span starts with a first symbol of a monitoring occasion and ends with a last symbol of a monitoring occasion.

According to a third aspect provided in addition to the first or second aspect, the minimum span time gap is between an end of one time span and a start of the subsequent time span. In an optional implementation, the capability indication indicates a value of the minimum span time gap and the span length of a time span, or wherein the capability indication indicates the span length of a time span and a minimum span time separation between a start of one time span and a start of the subsequent time span. In an optional implementation, the minimum span time gap and the minimum span time separation is indicated in terms of one or more symbols. In an optional implementation, the minimum span time gap or minimum span time separation is indicated in terms of one or more slots, and optionally wherein the span length is indicated in terms of symbols. In an optional implementation, the processor, when in operation, determines, from among a plurality of different combinations of minimum span time gaps and span lengths, one or more combinations that correspond to the capability of the UE, and wherein the transmitter, when in operation, indicates the determined one or more combinations of the minimum span time gaps and the span lengths in the capability indication. In an optional implementation, the processor, when in operation, determines, from among a plurality of different combinations of minimum span time separations and span lengths, one or more combinations that correspond to the capability of the UE, and wherein the transmitter, when in operation, indicates the determined one or more combinations of the minimum span time separations and the span lengths in the capability indication.

According to a fourth aspect provided in addition to one of the first to third aspects, the minimum group time gap is between an end of one grouping window and a start of the subsequent grouping window. In an optional implementation, the capability indication indicates a value of the minimum group time gap and the grouping window length, or wherein the capability indication indicates the grouping window length and a minimum group time separation between a start of one grouping window and a start of the subsequent grouping window. In an optional implementation, the processor, when in operation, determines, from among a plurality of different combinations of minimum group time gaps and grouping window lengths, one or more combinations that correspond to the capability of the UE, and wherein the transmitter, when in operation, indicates the determined one or more combinations of the minimum group time gaps and the grouping window lengths in the capability indication. In an optional implementation, the processor, when in operation, determines, from among a plurality of different combinations of minimum group time separations and grouping window lengths, one or more combinations that correspond to the capability of the UE, and wherein the transmitter, when in operation, indicates the determined one or more combinations of the minimum group time separations and the grouping window lengths in the capability indication. In an optional implementation, the second capability condition further requires a maximum number of time spans within each group of time spans, and the capability indication for second capability condition further indicates the maximum number of time spans within each group of time spans. In an optional implementation, the grouping window length is indicated in terms of slots, and optionally wherein the minimum group time gap is indicated in terms of slots, and optionally wherein the minimum group time separation is indicated in terms of slots.

According to a fifth aspect, provided in addition to one of the first to fourth aspects, the processor, when determining the second capability condition, determines one or more of the minimum group time gap and the grouping window length from stored information, based on a subcarrier spacing used for the downlink control channel. In an optional implementation, the stored information includes an association of different subcarrier spacings with one or more of different minimum group time gap values and different grouping window lengths According to a sixth aspect, provided in addition to one of the first to fifth aspects, time spans grouped within the grouping window are repeated every N slots, and wherein the grouping window, including the grouped time spans, starts at the beginning of the N slots.

According to a seventh aspect provided in addition to one of the first and sixth aspects, the determined capability of the UE, including one or more of the first and second capability conditions, applies to one or more of:
a subcarrier spacing used for the downlink control channel higher than 120 kHz, optionally a subcarrier spacing of 480 kHz and 960 kHz or higher, and
a frequency range in which the downlink control channel is transmitted higher than 52.6 GHz, optionally a frequency range of 52.6 GHz to 71 GHz.

According to an eighth aspect provided in addition to one of the first to seventh aspects, the determined capability of the UE, including one or more of the first and second capability conditions, does not apply to a first set of common search spaces, optionally wherein the first set of common search spaces are configured for all UEs in a cell. In an optional implementation, wherein the determined capability of the UE, including one or more of the first and second capability conditions, does apply to one or more of:
UE-specific search spaces, and
a second set of common search spaces.

In an optional implementation, the second set of common search spaces comprises one or more of common search spaces that are configured in a dedicated message to the UE and of common search spaces that are configured commonly for a group of UEs.

According to a ninth aspect provided in addition to one of the first to eighth aspects, the processor, when in operation, determines, based on the received configuration information, one or more monitoring occasions in which the UE monitors the downlink control channel. In an optional implementation, the processor further maps monitoring candidates of the downlink control channel to the one or more monitoring occasions based on mapping rules, wherein the mapping rules include:
monitoring candidates for monitoring occasions associated with common search spaces are mapped first,
monitoring candidates for monitoring occasions associated with UE-specific search spaces are determined next, and in an ascending order of indexes assigned to the UE-specific search spaces.
An optional implementation further includes:
wherein the processor determines one or more of a maximum number of blind decoding attempts and of a maximum number of control channel elements for the UE, and when the processor determines that the maximum number of blind decoding attempts or the maximum number of control channel elements is reached for a UE, the processor does not map further monitoring candidates for the monitoring occasions for the UE.

According to a tenth aspect provided in addition to one of the first to ninth aspects, when the processor determines that a monitoring occasion for a search space does not comply with one or more of the first and second capability conditions of the UE, the processor determines to skip said non-complying monitoring occasion or determines to skip all the monitoring occasions of the search space with which said non-complying monitoring occasion is associated.

According to an eleventh aspect, provided in addition to one of the first to tenth aspects, the processor determines the capability of the UE from information stored in the UE According to a twelfth aspect, a method is provided comprising the following steps performed by a user equipment, UE:
determining a capability of the UE for operating a monitoring function, wherein the monitoring function is operated by the UE for monitoring a downlink control channel in one or more monitoring occasions for the purpose of receiving a downlink control information message. The determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots.

The method further comprises transmitting a capability indication to a base station, wherein the capability indication includes information on the determined capability of a UE for operating the monitoring function, wherein the capability indication indicates the first capability condition of the UE and optionally includes the second capability condition of the UE, and receiving from the base station, configuration information for configuring the monitoring function at the UE, wherein the configuration information configures one or more monitoring occasions in which the UE monitors the downlink control channel.

According to a thirteenth aspect, a UE is provided comprising: a processor, which in operation, determines a capability of the UE for operating a monitoring function, wherein the monitoring function is operated by the UE for monitoring a downlink control channel in one or more monitoring occasions for the purpose of receiving a downlink control information message. The determined capability of the UE involves the following first capability condition of a UE for operating the monitoring function:

the first capability condition regarding a minimum span time gap between two consecutive time spans having a span length of one or more consecutive symbols, wherein each time span may contain one or more monitoring occasions for the downlink control channel, wherein the minimum span time gap is indicated in terms of one or more slots.

A transmitter transmits a capability indication to a base station, wherein the capability indication includes information on the determined capability of a UE for operating the monitoring function, wherein the capability indication indicates the first capability condition of the UE. A receiver receives from the base station, configuration information for configuring the monitoring function at the UE, wherein the configuration information configures one or more monitoring occasions in which the UE monitors the downlink control channel According to a fourteenth aspect, provided in addition to the thirteenth aspect, wherein the minimum span time gap is between an end of one time span and a start of the subsequent time span.

In an optional implementation, the capability indication indicates a value of the minimum span time gap and the span length of a time span, or wherein the capability indication indicates the span length of a time span and a minimum span time separation between a start of one time span and a start of the subsequent time span. In an optional implementation, the processor, when in operation, determines, from among a plurality of different combinations of minimum span time gaps and span lengths, one or more combinations that correspond to the capability of the UE, and wherein the transmitter, when in operation, indicates the determined one or more combinations of the minimum span time gaps and the span lengths in the capability indication.

In an optional implementation, the processor, when in operation, determines, from among a plurality of different combinations of minimum span time separations and span lengths, one or more combinations that correspond to the capability of the UE, and wherein the transmitter, when in operation, indicates the determined one or more combinations of the minimum span time separations and the span lengths in the capability indication.

According to a fifteenth aspect, provided in addition to the thirteenth or fourteenth aspect, the processor, when in operation, determines the capability of the UE further involving:

a second capability condition regarding a minimum group time gap between two consecutive groups of time spans within a grouping window having a length of one or more slots, The processor, when determining the second capability condition, determines one or more of the minimum group time gap and the grouping window length from stored information, based on a subcarrier spacing used for the downlink control channel. In an optional implementation, the stored information includes an association of different subcarrier spacings used for the downlink control channel with one or more of different minimum group time gap values and different grouping window lengths According to a sixteenth aspect, provided in addition to one of the thirteenth to fifteenth aspects, wherein the determined capability of the UE, including one or more of the first and second capability conditions, applies to one or more of:

a subcarrier spacing used for the downlink control channel higher than 120 kHz, optionally a subcarrier spacing of 480 kHz and 960 kHz or higher, and a frequency range in which the downlink control channel is transmitted higher than 52.6 GHz, optionally a frequency range of 52.6 GHz to 71 GHz.

According to a seventeenth aspect, provided in addition to one of the thirteenth to sixteenth aspects, the determined capability of the UE, including one or more of the rust and second capability conditions, does not apply to one or more of a first set of common search spaces, optionally wherein the first set of common search spaces are configured for all UEs in a cell. In an optional implementation, the determined capability of the UE, including one or more of the first and second capability conditions, does apply to one or more of:

UE-specific search spaces, and a second set of common search spaces.

In an optional implementation, the second set of common search spaces comprises one or more of common search spaces that are configured in a dedicated message to the UE and of common search spaces that are configured commonly for a group of UEs.

According to an eighteenth aspect, a method is comprising the following steps performed by a user equipment, UE:

determining a capability of the UE for operating a monitoring function, wherein the monitoring function is operated by the UE for monitoring a downlink control channel in one or more monitoring occasions for the purpose of receiving a downlink control information message, wherein the determined capability of the UE involves the following first capability condition of a UE for operating the monitoring function:

the first capability condition regarding a minimum span time gap between two consecutive time spans having a span length of one or more consecutive symbols, wherein each time span may contain one or more monitoring occasions for the downlink control channel, wherein the minimum span time gap is indicated in terms of one or more slots, transmitting a capability indication to a base station, wherein the capability indication includes information on the determined capability of a UE for operating the monitoring function, wherein the capability indication indicates the first capability condition of the UE, receiving from the base station, configuration information for configuring the monitoring function at the UE, wherein the configuration information configures one or more monitoring occasions in which the UE monitors the downlink control channel.

According to a nineteenth aspect, a base station is provided comprising: a receiver, which in operation, receives, respectively from one or more user equipments, UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a first capability condition as the capability of the UE: the first capability condition regarding a minimum span time gap between two consecutive time spans having a span length of one or more consecutive symbols, wherein each time span may contain one or more monitoring occasions for the downlink control channel, wherein a processor, when in operation, determines a second capability condition of the one or more UEs regarding a minimum group time gap between two consecutive groups of time spans within a grouping window having a length of one or more slots, either from information indicated by the received capability indication or from stored information and a subcarrier spacing used by the respective UE for the downlink control channel, the processor, which in operation, determines, respectively for the one or more UEs, one or more monitoring occasions to be monitored on the downlink control channel, based on the first and second capability conditions determined for all the one or more UEs, a transmitter, which in operation, transmits, to each of the one or more UEs, configuration information for configuring the monitoring function at the UE, including configuring one or more monitoring occasions, in which the respective UE monitors the downlink control channel.

According to a 20$^{th}$ aspect, provided in addition to the nineteenth aspect, the stored information for determining the second capability condition includes an association of different subcarrier spacings used for the downlink control channel with one or more of different minimum group time gap values and different grouping window lengths According to a 21$^{th}$ aspect, provided in addition to the nineteenth or 20$^{th}$ aspect, the processor, when determining the one or more monitoring occasions, takes into account that the determined capability of the UE, including one or more of the first and second capability conditions, does not apply to one or more of a first set of common search spaces, optionally wherein the first set of common search spaces are configured for all UEs in a cell. In an optional implementation, the processor, when determining the one or more monitoring occasions, takes into account that the determined capability of the UE, including one or more of the first and second capability conditions, does apply to one or more of:
  UE-specific search spaces, and
  a second set of common search spaces.

In an optional implementation, the second set of common search spaces comprises one or more of common search spaces that are configured in a dedicated message to the UE and of common search spaces that are configured commonly for a group of UEs.

According to a 22$^{nd}$ aspect, provided in addition to one of the nineteenth to 21$^{st}$ aspects, the processor maps monitoring candidates of the downlink control channel to the one or more monitoring occasions based on mapping rules, wherein the mapping rules include:

monitoring candidates for monitoring occasions associated with common search spaces are determined first, monitoring candidates for monitoring occasions associated with UE-specific search spaces are determined next, and in an ascending order of indexes assigned to the UE-specific search spaces.

In an optional implementation, the mapping rules include:

wherein the processor determines one or more of a maximum number of blind decoding attempts and of a maximum number of control channel elements for the UE, and when the processor determines that the maximum number of blind decoding attempts or the maximum number of control channel elements is reached for a UE, the processor does not map further monitoring candidates for the monitoring occasions for the UE.

According to a 23$^{rd}$ aspect, provided in addition to one of the nineteenth to 22$^{nd}$ aspects, when the processor determines that a monitoring occasion for a search space does not comply with the one or more of the first and second capability conditions of the UE, the processor determines to skip said non-complying monitoring occasion or determines to skip all the monitoring occasions of the search space with which said non-complying monitoring occasion is associated.

According to a 24$^{th}$ aspect, provided in addition to one of the nineteenth to 23$^{rd}$ aspects, when the processor determines that a monitoring occasion for a search space does not comply with one of more of the first and second capability conditions of the respective UE, the processor configures the monitoring occasion for the UE that does not comply with the one or more capabilities of the respective UE.

According to a 25$^{th}$ aspect, a method is provided comprising the following steps performed by a base station:

receiving, respectively from one or more user equipments, UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a rust capability condition as a capability of the UE: the first capability condition regarding a minimum span time gap between two consecutive time spans having a span length of one or more consecutive symbols, wherein each time span may contain one or more monitoring occasions for the downlink control channel, determining a second capability condition of the one or more UEs regarding a minimum group time gap between two consecutive groups of time spans within a grouping window having a length of one or more slots, either from information indicated by the received capability indication or from stored information and a subcarrier spacing used by the respective UE for the downlink control channel, determining, respectively for the one or more UEs, one or more monitoring occasions to be monitored on the downlink control channel, based on the first and second capability conditions determined for all the one or more UEs, transmitting, to each of the one or more UEs, configuration information for configuring the monitoring function at the UE, including configuring one or more monitoring occasions, in which the respective UE monitors the downlink control channel.

According to a 26$^{th}$ aspect, a base station is provided comprising:

a receiver, which in operation, receives, respectively from one or more user equipments. UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a first capability condition as the capability of the UE:

the first capability condition regarding a minimum span time gap between two consecutive time spans having a span length of one or more consecutive symbols, wherein each time span may contain one or monitoring occasions for the downlink control channel, wherein the minimum span time gap is indicated in terms of one or more slots, a processor, which in operation, determines, respectively for the one or more UEs, one or more monitoring occasions to be monitored on the downlink control channel, based on the first capability condition determined for all the one or more UEs, a transmitter, which in operation, transmits, to each of the one or more UEs, configuration information for configuring the monitoring function at the UE, including configuring one or more monitoring occasions, in which the respective UE monitors the downlink control channel.

According to a 27$^{th}$ aspect, a method is provided comprising the following steps performed by a base station:

receiving, respectively from one or more user equipments, UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a rust capability condition as the capability of the UE:

the first capability condition regarding a minimum span time gap between two consecutive time spans having a span length of one or more consecutive symbols, wherein each time span may contain one or more monitoring occasions for the downlink control channel, wherein the minimum span time gap is indicated in terms of one or more slots, determining, respectively for the one or more UEs, one or more monitoring occasions to be monitored on the downlink control channel, based on the first capability condition determined for all the one or more UEs, transmitting, to each of the one or more UEs, configuration information for configuring the monitoring function at the UE, including configuring one or more monitoring occasions, in which the respective UE monitors the downlink control channel.

According to a 28$^{th}$ aspect, an integrated circuit is provided which, in operation, controls a process of a user equipment, the process comprising the following steps performed by the user equipment:

determining a capability of the UE for operating a monitoring function, wherein the monitoring function is operated by the UE for monitoring a downlink control channel in one or more monitoring occasions for the purpose of receiving a downlink control information message, wherein the determined capability of the UE involves the following two capability conditions of a UE for operating the monitoring function:

a first capability condition regarding a minimum span time gap between two consecutive time spans having a span length of one or more consecutive symbols, wherein each time span may contain one or more monitoring occasions for the downlink control channel, a second capability condition regarding a minimum group time gap between two consecutive groups of time spans within a grouping window having a length of one or more slots, transmitting a capability indication to a base station, wherein the capability indication includes information on the determined capability of a UE for operating the monitoring function, wherein the capability indication indicates the first capability condition of the UE and optionally includes the second capability condition of the UE, receiving from the base station, configuration information for configuring the monitoring function at the UE, wherein the configuration information configures one or more monitoring occasions in which the UE monitors the downlink control channel.

According to a 29$^{th}$ aspect, an integrated circuit is provided which, in operation, controls a process of a user equipment, the process comprising the following steps performed by the user equipment:

determining a capability of the UE for operating a monitoring function, wherein the monitoring function is operated by the UE for monitoring a downlink control channel in one or more monitoring occasions for the purpose of receiving a downlink control information message, wherein the determined capability of the UE involves the following first capability condition of a UE for operating the monitoring function:

the first capability condition regarding a minimum span time gap between two consecutive time spans having a span length of one or more consecutive symbols, wherein each time span may contain one or more monitoring occasions for the downlink control channel, wherein the minimum span time gap is indicated in terms of one or more slots, transmitting a capability indication to a base station, wherein the capability indication includes information on the determined capability of a UE for operating the monitoring function, wherein the capability indication indicates the first capability condition of the UE, receiving from the base station, configuration information for configuring the monitoring function at the UE, wherein the configuration information configures one or more monitoring occasions in which the UE monitors the downlink control channel.

According to a 30$^{th}$ aspect, an integrated circuit is provided which, in operation, controls a process of a base station, the process comprising the following steps performed by the base station:

receiving, respectively from one or more user equipments, UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a first capability condition as a capability of the UE:

the first capability condition regarding a minimum span time gap between two consecutive time spans having a span length of one or more consecutive symbols, wherein each time span may contain one or more monitoring occasions for the downlink control channel, determining a second capability condition of the one or more UEs regarding a minimum group time gap between two consecutive groups of time spans within a grouping window having a length of one or more slots, either from information indicated by the received capability indication or from stored information and a subcarrier spacing used by the respective UE for the downlink control channel, determining, respectively for the one or more UEs, one or more monitoring occasions to be monitored on the downlink control channel, based on the first and second capability conditions determined for all the one or more UEs, transmitting, to each of the one or more UEs, configuration information for configuring the monitoring function at the UE, including configuring one or more monitoring occasions, in which the respective UE monitors the downlink control channel.

According to a 31$^{st}$ aspect, an integrated circuit is provided which, in operation, controls a process of a base station, the process comprising the following steps performed by the base station:

receiving, respectively from one or more user equipments, UEs, a capability indication, the capability indication indicating a capability of the UE for operating a monitoring function, wherein the monitoring function is operated by the UE for monitoring a downlink control channel in one or more monitoring occasions for the purpose of receiving a downlink control information message, wherein the capability indication from each UE indicates a first capability condition as the capability of the UE:

the first capability condition regarding a minimum span time gap between two consecutive time spans having a span length of one or more consecutive symbols, wherein each time span may contain one or more monitoring occasions for the downlink control channel, wherein the minimum span time gap is indicated in terms of one or more slots, determining, respectively for the one or more UEs, one or more monitoring occasions to be monitored on the downlink control channel, based on the first capability condition determined for all the one or more UEs, transmitting, to each of the one or more UEs, configuration information for configuring the monitoring function at the UE, including configuring one or more monitoring occasions, in which the respective UE monitors the downlink control channel.

Further Variants, Including Hardware and Software Implementation of the Present Disclosure The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Further, the various embodiments may also be implemented by means of software modules, which are executed by a processor or directly in hardware. Also a combination of software modules and a hardware implementation may be possible. The software modules may be stored on any kind of computer readable storage media, for example, RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:

a processor, which in operation, determines a capability of the UE for operating a monitoring function, wherein the monitoring function is operated by the UE for monitoring a downlink control channel in one or more monitoring occasions for the purpose of receiving a downlink control information message, wherein the determined capability of the UE involves a capability condition regarding a minimum group time gap between two consecutive groups of time spans within a grouping window having a length of one or more slots;

a transmitter, which in operation, transmits a capability indication to a base station, wherein the capability indication indicates the capability condition of the UE; and a receiver, which in operation, receives, from the base station, configuration information for configuring the monitoring function at the UE, wherein the configuration information configures the one or more monitoring occasions in which the UE monitors the downlink control channel, wherein the processor, when determining the capability condition, determines one or more of the minimum group time gap or the grouping window length based on stored information in the UE and a subcarrier spacing used for the downlink control channel, and wherein the stored information in the UE includes an association of different subcarrier spacings with one or more of: different minimum group time gap values or different grouping window lengths.

2. The UE according to claim 1, wherein each time span of the two consecutive groups of time spans is formed of a number of consecutive symbols containing the one or more monitoring occasions of the downlink control channel, wherein each monitoring occasion of the one or more monitoring occasions is completely within one time span of the two consecutive groups of time spans, wherein the one time span starts with a first symbol of a monitoring occasion and ends with a last symbol of the monitoring occasion.

3. The UE according to claim 1, wherein the minimum group time gap is between an end of one grouping window and a start of a subsequent grouping window, wherein the capability indication indicates a value of the minimum group time gap and the grouping window length, or wherein the capability indication indicates the grouping window length and a minimum group time separation between a start of the one grouping window and the start of the subsequent grouping window, wherein the processor, when in operation, determines, from among a plurality of different combinations of minimum group time gaps and grouping window lengths, one or more combinations that correspond to the capability of the UE, and wherein the transmitter, when in operation, indicates the determined one or more combinations of the minimum group time gaps and the grouping window lengths in the capability indication, wherein the processor, when in operation, determines, from among a plurality of different combinations of minimum group time separations and grouping window lengths, one or more combinations that correspond to the capability of the UE, and wherein the transmitter, when in operation, indicates the determined one or more combinations of the minimum group time separations and the grouping window lengths in the capability indication, wherein the capability condition further requires a maximum number of time spans within each group of the two consecutive groups of time spans, and the capability indication for the capability condition further indicates the maximum number of time spans within each group of the two consecutive groups of time spans, and wherein the grouping window length is indicated in terms of slots, and wherein the minimum group time gap is indicated in terms of slots, and wherein the minimum group time separation is indicated in terms of slots.

4. The UE according to claim 1, wherein the time spans grouped within the grouping window are repeated every N slots, and wherein the grouping window, including the grouped time spans, starts at the beginning of the N slots.

5. The UE according to claim 1, wherein the determined capability of the UE, including the capability condition, applies to one or more of:

a subcarrier spacing used for the downlink control channel which is: higher than 120 KHz; 480 kHz or higher; or 960 kHz or higher; and a frequency range in which the downlink control channel is transmitted which is: higher than 52.6 GHz; or 52.6 GHz to 71 GHz.

6. The UE according to claim 1, wherein the determined capability of the UE, including the capability condition, does not apply to a first set of common search spaces, wherein the first set of common search spaces are configured for all UEs in a cell, wherein the determined capability of the UE, including the capability condition, does apply to one or more of: UE-specific search spaces, and a second set of common search spaces, wherein the second set of common search spaces comprises one or more of common search spaces that are configured in a dedicated message to the UE and of common search spaces that are configured commonly for a group of UEs.

7. The UE according to claim 1, wherein the processor, when in operation, determines, based on the received configuration information, the one or more monitoring occasions in which the UE monitors the downlink control channel, the processor further maps monitoring candidates of the downlink control channel to the one or more monitoring occasions based on mapping rules, wherein the mapping rules include:

monitoring candidates for monitoring occasions associated with common search spaces are mapped first; and monitoring candidates for monitoring occasions associated with UE-specific search spaces are determined next, and in an ascending order of indexes assigned to the UE-specific search spaces, and wherein the processor further determines one or more of a maximum number of blind decoding attempts and of a maximum number of control channel elements for the UE, and when the processor determines that the maximum number of blind decoding attempts or the maximum number of control channel elements is reached for a UE, the processor does not map further monitoring candidates for the monitoring occasions for the UE.

8. The UE according to claim 1, wherein when the processor determines that a monitoring occasion for a search space does not comply with the capability condition of the UE, the processor determines to skip said non-complying monitoring occasion or determines to skip all the monitoring occasions of the search space with which said non-complying monitoring occasion is associated.

9. A method performed by a user equipment (UE), comprising:

determining a capability of the UE for operating a monitoring function, wherein the monitoring function is operated by the UE for monitoring a downlink control channel in one or more monitoring occasions for the purpose of receiving a downlink control information message, wherein the determined capability of the UE involves a capability condition regarding a minimum group time gap between two consecutive groups of time spans within a grouping window having a length of one or more slots;

transmitting a capability indication to a base station, wherein the capability indication indicates the capability condition of the UE; and receiving, from the base station, configuration information for configuring the monitoring function at the UE, wherein the configuration information configures the one or more monitoring occasions in which the UE monitors the downlink control channel, wherein the determining the capability condition includes determining one or more of the minimum group time gap or the grouping window length based on stored information in the UE and a subcarrier spacing used for the downlink control channel, and wherein the stored information in the UE includes an association of different subcarrier spacings with one or more of; different minimum group time gap values or different grouping window lengths.

10. A base station comprising:

a receiver, which in operation, receives, respectively from one or more user equipments (UEs), a capability indication, the capability indication indicating a capability of a respective UE of the one or more UEs for operating a monitoring function, wherein the monitoring function is operated by the UE for monitoring a downlink control channel in one or more monitoring occasions for the purpose of receiving a downlink control information message;

a processor, which in operation, determines a capability condition of the one or more UEs regarding a minimum group time gap between two consecutive groups of time spans within a grouping window having a length of one or more slots based on stored information in the UE and a subcarrier spacing used by the respective UE for the downlink control channel, wherein the stored information in the UE includes an association of different subcarrier spacings with one or more of: different minimum group time gap values or different grouping window lengths, wherein the processor, which in operation, further determines, respectively for the one or more UEs, the one or more monitoring occasions to be monitored on the downlink control channel, based on the capability condition determined for all the one or more UEs; and a transmitter, which in operation, transmits, to each of the one or more UEs, configuration information for configuring the monitoring function at the UE, including configuring one or more monitoring occasions, in which the respective UE monitors the downlink control channel.

11. The base station according to claim 10, wherein the processor, when determining the one or more monitoring occasions, takes into account that the determined capability of the UE, including the capability condition, does not apply to one or more of a first set of common search spaces, wherein the first set of common search spaces are configured for all UEs in a cell, wherein the processor, when determining the one or more monitoring occasions, takes into account that the determined capability of the UE, including the capability condition, does apply to one or more of:

UE-specific search spaces, and a second set of common search spaces, wherein the second set of common search spaces comprises one or more of common search spaces that are configured in a dedicated message to the UE and of common search spaces that are configured commonly for a group of UEs.

12. The base station according to claim 10, wherein the processor maps monitoring candidates of the downlink control channel to the one or more monitoring occasions based on mapping rules, wherein the mapping rules include:

monitoring candidates for monitoring occasions associated with common search spaces are determined first; and monitoring candidates for monitoring occasions associated with UE-specific search spaces are determined next, and in an ascending order of indexes assigned to the UE-specific search spaces, wherein the processor further determines one or more of a maximum number of blind decoding attempts and of a maximum number of control channel elements for the UE, and when the processor determines that the maximum number of blind decoding attempts or the maximum number of control channel elements is reached for a UE, the processor does not map further monitoring candidates for the monitoring occasions for the UE.

13. The base station according to claim 10, wherein when the processor determines that a monitoring occasion for a search space does not comply with the capability condition of the UE, the processor determines to skip said non-complying monitoring occasion or determines to skip all the monitoring occasions of the search space with which said non-complying monitoring occasion is associated.

14. The base station according to claim 10, wherein when the processor determines that a monitoring occasion for a search space does not comply with the capability condition of the respective UE, the processor configures the monitoring occasion for the UE that does not comply with the one or more capabilities of the respective UE.

* * * * *